(12) United States Patent
Daniel et al.

(10) Patent No.: US 8,269,141 B2
(45) Date of Patent: Sep. 18, 2012

(54) POWER SOURCE FOR ELECTRIC ARC WELDING

(75) Inventors: Joseph A. Daniel, Sagamore Hills, OH (US); Todd E. Kooken, University Hts., OH (US); Lifeng Luo, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 993 days.

(21) Appl. No.: 10/889,866

(22) Filed: Jul. 13, 2004

(65) Prior Publication Data

US 2006/0011595 A1    Jan. 19, 2006

(51) Int. Cl.
B23K 9/10    (2006.01)
B23K 9/12    (2006.01)

(52) U.S. Cl. .............................. 219/130.1; 219/137 PS

(58) Field of Classification Search ............... 219/130.1, 219/130.51, 137 PS, 130.21
See application file for complete search history.

(56) References Cited

U.S. PATENT DOCUMENTS

| | | |
|---|---|---|
| 3,459,920 A | 8/1969 | Sevenco |
| 3,737,755 A | 6/1973 | Calkin |
| 3,809,853 A | 5/1974 | Manz |
| 3,904,846 A | 9/1975 | Risberg |
| 3,984,799 A | 10/1976 | Fletcher et al. |
| 4,020,320 A | 4/1977 | Pijls |
| 4,020,361 A | 4/1977 | Suelzle |
| 4,049,946 A | 9/1977 | Fluckiger |
| 4,125,759 A | 11/1978 | Kiyohara |
| 4,201,906 A | 5/1980 | Puschner |
| 4,245,285 A | 1/1981 | Weiss |
| 4,403,269 A | 9/1983 | Carroll |
| 4,409,465 A | 10/1983 | Yamamoto |
| 4,425,613 A | 1/1984 | Shelly et al. |
| 4,433,370 A | 2/1984 | Karadsheh et al. |
| 4,442,339 A | 4/1984 | Mizuno |
| 4,442,370 A | 4/1984 | Veyssiere |
| 4,447,695 A | 5/1984 | Inoue |
| 4,485,293 A | 11/1984 | Tabata |
| 4,494,180 A | 1/1985 | Streater |
| 4,503,316 A | 3/1985 | Murase et al. |
| 4,518,844 A | 5/1985 | Needham |

(Continued)

FOREIGN PATENT DOCUMENTS

AU    2005-237177    11/2005

(Continued)

OTHER PUBLICATIONS

*Sinusoidal Line Current Rectification with a 100 kHz B-Sit Step-Up Converter* by Ned Mohan, Tore M. Undeland and Ralph J. Ferraro—1984.

(Continued)

*Primary Examiner* — Sang Paik
(74) *Attorney, Agent, or Firm* — Perkins Coie LLP

(57) ABSTRACT

A power source for an electric arc welding process, wherein the power source comprises an input stage having an AC input and a first DC output signal; a second stage in the form of an unregulated DC to DC converter having an input connected to the first DC output signal and an output in the form of a second DC output signal electrically isolated from the first DC output signal and with a magnitude of a given ratio to the first DC output signal; and, a third stage to convert the second DC output signal to a welding output for the welding process.

76 Claims, 10 Drawing Sheets

U.S. PATENT DOCUMENTS

| | | | |
|---|---|---|---|
| 4,521,671 A | 6/1985 | Fronius | |
| 4,521,672 A | 6/1985 | Fronius | |
| 4,533,986 A | 8/1985 | Jones | |
| 4,540,892 A | 9/1985 | Carvalho | |
| 4,546,234 A | 10/1985 | Ogasawara | |
| 4,564,742 A | 1/1986 | Karlsson et al. | |
| 4,618,919 A | 10/1986 | Martin, Jr. | |
| 4,635,181 A | 1/1987 | Bourgeault | |
| 4,677,366 A | 6/1987 | Wilkinson | |
| 4,677,667 A | 6/1987 | Burns | |
| 4,720,667 A | 1/1988 | Lee | |
| 4,720,668 A | 1/1988 | Lee | |
| 4,748,397 A | 5/1988 | Ogawa et al. | |
| 4,779,184 A | 10/1988 | White | |
| 4,855,888 A | 8/1989 | Henze et al. | |
| 4,857,822 A | 8/1989 | Tabisz | |
| 4,864,479 A | 9/1989 | Steigerwald et al. | |
| 4,866,247 A | 9/1989 | Parks | |
| 4,889,969 A | 12/1989 | Kawai | |
| 4,904,843 A | 2/1990 | Hori | |
| 4,924,170 A | 5/1990 | Henze | |
| 4,963,715 A | 10/1990 | Tuttle | |
| 4,964,026 A | 10/1990 | Locascio | |
| 5,001,326 A | 3/1991 | Stava | |
| 5,001,623 A | 3/1991 | Magid | |
| 5,008,795 A | 4/1991 | Parsley et al. | |
| 5,019,952 A | 5/1991 | Smolenski | |
| 5,066,900 A | 11/1991 | Bassett | |
| 5,113,337 A | 5/1992 | Steigerwald | |
| 5,130,561 A | 7/1992 | Elliott et al. | |
| 5,149,933 A | 9/1992 | Donner | |
| 5,172,309 A | 12/1992 | DeDoncher et al. | |
| 5,220,151 A | 6/1993 | Terayama et al. | |
| 5,225,660 A * | 7/1993 | Mita et al. | 219/137 PS |
| 5,235,504 A | 8/1993 | Sood | |
| 5,245,525 A | 9/1993 | Galloway | |
| 5,272,313 A | 12/1993 | Karino | |
| 5,278,390 A | 1/1994 | Blankenship | |
| 5,319,533 A | 6/1994 | Reynolds | |
| 5,321,348 A | 6/1994 | Vinciarelli | |
| 5,343,017 A | 8/1994 | Karino | |
| 5,343,140 A | 8/1994 | Gegner | |
| 5,349,149 A | 9/1994 | Shiraki et al. | |
| 5,349,157 A | 9/1994 | Blankenship | |
| 5,349,159 A | 9/1994 | Mita et al. | |
| 5,367,448 A | 11/1994 | Carroll | |
| 5,402,060 A | 3/1995 | Erisman | |
| 5,406,051 A | 4/1995 | Lai | |
| 5,414,238 A | 5/1995 | Steigerwald et al. | |
| 5,414,613 A | 5/1995 | Chen | |
| 5,418,704 A | 5/1995 | Hua | |
| 5,434,768 A | 7/1995 | Jitaru | |
| 5,440,179 A | 8/1995 | Severinsky | |
| 5,444,356 A | 8/1995 | Reynolds et al. | |
| 5,465,011 A | 11/1995 | Miller | |
| 5,477,131 A | 12/1995 | Gegner | |
| 5,543,704 A | 8/1996 | Thoren | |
| 5,601,741 A | 2/1997 | Thommes | |
| 5,612,609 A | 3/1997 | Choi | |
| 5,615,095 A | 3/1997 | Reynolds et al. | |
| 5,615,098 A | 3/1997 | Ishii | |
| 5,636,114 A | 6/1997 | Bhagwat | |
| 5,710,696 A | 1/1998 | Reynolds | |
| 5,715,150 A | 2/1998 | Stava | |
| 5,747,972 A | 5/1998 | Baretich et al. | |
| 5,760,372 A | 6/1998 | Karino et al. | |
| 5,771,163 A | 6/1998 | Moriguchi | |
| 5,786,992 A | 7/1998 | Vinciarelli | |
| 5,811,757 A | 9/1998 | Higgins | |
| 5,824,990 A | 10/1998 | Geissler | |
| 5,825,642 A | 10/1998 | Ishii | |
| 5,831,240 A | 11/1998 | Katooka | |
| 5,864,116 A | 1/1999 | Baker | |
| 5,867,374 A | 2/1999 | Moreau | |
| 5,874,826 A | 2/1999 | Chen | |
| 5,875,104 A | 2/1999 | Prager | |
| 5,894,414 A | 4/1999 | Jiang | |
| 5,917,711 A | 6/1999 | Shikata | |
| 5,926,381 A | 7/1999 | Moriguchi | |
| 5,990,445 A | 11/1999 | Ogasawara et al. | |
| 5,991,169 A | 11/1999 | Kooken | |
| 5,991,180 A | 11/1999 | Vogel | |
| 6,023,037 A | 2/2000 | Church et al. | |
| 6,023,154 A | 2/2000 | Martinez | |
| 6,023,416 A | 2/2000 | Shikata | |
| 6,051,804 A | 4/2000 | Reynolds et al. | |
| 6,051,806 A | 4/2000 | Shikata | |
| 6,054,674 A | 4/2000 | Moriguchi | |
| 6,055,161 A | 4/2000 | Church | |
| 6,067,241 A | 5/2000 | Lu | |
| 6,069,801 A | 5/2000 | Hodge | |
| 6,069,811 A | 5/2000 | Moriguchi et al. | |
| 6,087,628 A | 7/2000 | Ferkel | |
| 6,091,612 A | 7/2000 | Blankenship | |
| 6,101,105 A | 8/2000 | Gilmore | |
| 6,115,273 A | 9/2000 | Geissler | |
| 6,177,645 B1 | 1/2001 | Church et al. | |
| 6,188,585 B1 | 2/2001 | Ikeda | |
| 6,198,642 B1 | 3/2001 | Kociecki | |
| 6,207,927 B1 | 3/2001 | Mita et al. | |
| 6,211,657 B1 | 4/2001 | Goluszek | |
| 6,236,014 B1 | 5/2001 | Ulrich | |
| 6,268,587 B1 | 7/2001 | Kooken | |
| 6,278,080 B1 | 8/2001 | Moriguchi | |
| 6,291,798 B1 | 9/2001 | Stava | |
| 6,300,589 B1 | 10/2001 | Reynolds et al. | |
| 6,329,636 B1 | 12/2001 | Geissler | |
| 6,331,694 B1 | 12/2001 | Blankenship | |
| 6,349,044 B1 | 2/2002 | Canales-Abarca | |
| 6,353,547 B1 | 3/2002 | Jang | |
| 6,365,874 B1 | 4/2002 | Stava | |
| 6,366,476 B1 | 4/2002 | Yasumura | |
| 6,384,373 B1 | 5/2002 | Schwartz | |
| 6,469,921 B2 | 10/2002 | Arai | |
| 6,472,634 B1 | 10/2002 | Houston et al. | |
| 6,483,687 B2 | 11/2002 | Katooka | |
| 6,501,049 B2 | 12/2002 | Stava | |
| 6,504,132 B1 | 1/2003 | Church | |
| 6,570,128 B1 | 5/2003 | Mela | |
| 6,570,130 B1 | 5/2003 | Kooken | |
| 6,600,134 B2 | 7/2003 | Stava | |
| 6,618,274 B2 | 9/2003 | Boylan | |
| 6,653,595 B2 | 11/2003 | Hutchison | |
| 6,660,966 B2 | 12/2003 | Houston | |
| 6,665,183 B1 | 12/2003 | Shikata | |
| 6,683,278 B2 | 1/2004 | Stava | |
| 6,710,299 B2 | 3/2004 | Blankenship | |
| 6,713,721 B2 | 3/2004 | Albrecht | |
| 6,717,107 B1 | 4/2004 | Hsu | |
| 6,723,957 B2 | 4/2004 | Holverson | |
| 6,750,637 B2 | 6/2004 | Nagaki et al. | |
| 6,815,639 B2 | 11/2004 | Geissler | |
| 6,864,479 B1 | 3/2005 | Davis et al. | |
| 2002/0125235 A1 | 9/2002 | Stava | |
| 2002/0191425 A1 | 12/2002 | Geissler | |
| 2003/0111451 A1 | 6/2003 | Blankenship et al. | |
| 2004/0206736 A1 * | 10/2004 | Nishikawa et al. | 219/130.1 |
| 2006/0175313 A1 | 8/2006 | Kooken et al. | |
| 2006/0213890 A1 | 9/2006 | Kooken et al. | |
| 2006/0226130 A1 | 10/2006 | Kooken et al. | |
| 2006/0243716 A1 | 11/2006 | Stava et al. | |
| 2007/0051712 A1 | 3/2007 | Kooken et al. | |

FOREIGN PATENT DOCUMENTS

| | | |
|---|---|---|
| AU | 2007200934 | 1/2011 |
| CN | 1838517 | 9/2006 |
| CN | 101941111 | 9/2010 |
| EP | 0704957 B1 | 1/1999 |
| EP | 0600268.0 | 5/1999 |
| EP | 1 616 654 A1 | 1/2006 |
| EP | 1615654 A | 1/2006 |
| EP | 1 688 203 A2 | 8/2006 |
| EP | 1 704 854 A1 | 9/2006 |
| GB | 2320627 A * | 6/1998 |
| JP | 58-132368 | 8/1983 |
| JP | 61-296965 | 12/1986 |
| JP | 1-143767 A | 6/1989 |

| | | |
|---|---|---|
| JP | 02-041777 A | 2/1990 |
| JP | 3-004376 A | 1/1991 |
| JP | 8 308219 | 11/1996 |
| JP | 09-271940 | 10/1997 |
| JP | 09-271940 A | 10/1997 |
| JP | 11-235040 | 8/1999 |
| JP | 11-235040 A | 8/1999 |
| JP | 2000-173794 | 6/2000 |
| JP | 2000-173794 A | 6/2000 |
| JP | 4303714 | 5/2009 |
| JP | 4762600 | 6/2011 |
| KR | 06075117 | 1/2007 |
| MX | PA05011461 | 9/2009 |
| TW | I314490 | 9/2009 |
| WO | WO 03/015973 | 2/2003 |
| WO | WO 03/015973 A | 2/2003 |

OTHER PUBLICATIONS

*The Incredible Shrinking (Unregulated) Power Supply* by Dr. Ray Ridley.
*Boost Power Factor Corrector Design with the UC3853*—Application Note U-159 by Phillip C. Todd—Unitrode Corporation—1999.
*Power Supply Cookbook* by Marty Brown—Copyright 1994 by Butterworth-Heinemann.
*Choose the Optimum Topology for High Power Factor* Supplies—by Bob Mammano and Lloyd Dixon—Unitrode IC Corporation PCIM Mar. 1991.
*High Power Factor Prenvulators for Off-Line Power Supplies* by Lloyd H. Dixon, Jr. Unitrode Corporation.
*The LT1248 Power-Factor Corrector* by Cark Nelson—Linear Technology Magazine—Jun. 1993.
*High Power Factor Preregulator*—Unitrode.
Patent Abstracts of Japan, EP 05 00 5216, The Hague, Oct. 21, 2005, Herbreteau, D. vol. 0142, No. 03 (M-966), Apr. 25, 1990 & JP 02 041777 A (Daihen Corp.), Feb. 9, 1990.
Lee et al, Recent Developments in High-Frequency Quasi-Resonant and Multi-Resonant Converter Technologies, 1989.
Liu and Lee, Zero-Voltage-Switching Technique in DC/DC Converters.
Tabisz, Gradzki, and Lee, Zero-Voltage-Switched Quasi-Resonant Buck and Flyback Converters, 1989.
Cho, "Novel Zero-Voltage-Transition, PWM Multiphase Converters," IEEE Transactions on Power Electronics, vol. 13, No. 1, Jan. 1998.
Huang, "A Scalable Multiphase Buck Converter with Average Current Shfare Bus", International Rectifier, 2003.
Schuellein, "Multiphase Converter Bucks Power"; EE Times, Sep. 11, 2000.
Czogalla, "Automotive Application of Multi-Phase Coupled-Inductor DC-DC Converter", IAS 2003.
Wong., Performance Improvements of Interleaved Converters, IAS 2003.
Zumel, Magnetic Integration for interleaved Converters, IEEE 2003.
Dixon, "Coupled Filter Inductors in Multi-Output Buck Regulators", Unitrode, Texas Instruments, 2003.
Shortt, A 600 Watt Four Stage Phase-Shifted-Parallel DC to DC Converter.
Cheung, "ISL6558EVAL 1-Multi-Phase Power Conversion for Routers and Pc-Peripheralsup to 100A".
Wang, "Carrier Phase Shifted SPWM Based on Current Sourced Multi-Modular Converter for Active Power Filter".
Jovanovic, Tabisz and Lee, "Zero-Voltage-Switching Technique. In High Frequency Off-Line Converters".
Tabisz and Lee, Zero-Voltage-Switching Multi-Resonant Technique—A Novel Approach to Improve Performance of High-Frequency Quasi-Resonant Converter.
Sabate, Vlatkovic, Ridley, Lee, and Cho, Design Considerations for High-Voltage High Power Full Bridge Zero-Voltage-Switched PWM Converter.
Fang, Chen, and Lee, Designing a High Efficiency FET Inverter Module for Vector Summation Switching High Power Amplier.
Hua, Lee, and Jovanovic, "An Improved Zero-Voltage-Swiched PWM Converter Using a Saturable Inductor", 1991.
Vorperian, "Quasi-Square-Wave Converters: Topologies and Analysis".
Hua and Lee, "A New Class of Zero-Voltage-Switched PWM Converters", 1991.
"High Efficiency Telecom Rectifier Using a Novel Soft-Switched Boost-Based Input Current Shaper"—ITTT, 1991.
"A New ZVT-PWM DC-DC Converter", IEEE 2002.
"A New ZVT-ZCT-PWM DC_DC Converter", IEEE 2004.
"Properties and Synthesis of Passive, Lossless Soft-Switching PWM Converters International Congress of Israel in Energy Power & Motion Control", May 1997.
Balogh, Bridge, and Andreycak, "Unique Cascaded Power Converter Topology for High Current Low Output Voltage Applications".
European Search Report, EP 06 00 0263, Munich, May 30, 2006, Jeggy T.
European Search Report, EP 06 00 0268.
EP Search Report, EP 05 02 5646, Jan. 23, 2008, Enguerran Despis.
European Search Report, EP 07 10 3523, Munnich, Jan. 30, 2008, Jeggy, Thierry.
Chinese Office Action, Publication No. 2005100840791.
1995 paper with translated abstract, "Study on Multi-Function Arc Welding Dual Inverter".
Japanese Office Action, Patent Application No. 2006-030436, Apr. 9, 2008.
Japanese Office Action, Patent Application No. 2005-314067, Apr. 9, 2008.
Mantaro Nakamura, "A Chopper Type DC/DC Converter", Application No. 7-283959, filed Oct. 31, 1995.
Japanese Office Action, Patent Application No. 2006-015765, Apr. 9, 2008.
Haruo Moriguchi, "An Arc Welding Machine", Application No. 56-212074, filed Dec. 25, 1981.
Masahiko Akamatsu, "DC Power Control Apparatus", Application No. 41-80885, filed Dec. 10, 1996.
Koichi Makinose et al., "DC/DC Converter", Application No. 2-223521, filed Aug. 24, 1990.
Canadian Office Action, Nov. 6, 2008.
Office Action of the IPO, Sep. 18, 2008.
The Notification of the First Office Action, Aug. 8, 2008.
Notice of the Final Rejection, Oct. 7, 2008, Patent Application No. 2005-314067.
Notice of Final Rejection, Oct. 7, 2008, Patent Application No. 2006-015765.
EP Search Report, EP 05 02 5646, Jan. 23, 2008.
EP Communication, 06 000 268.0-2302, Jan. 9, 2008.
Japanese Office Action, Patent Application No. 2005-134928, Jun. 19, 2008.
The Notification of the First Office Action, Jun. 13, 2008.
AU Application No. 2005202559: Office Action dated Nov. 1, 2006.
CN Application No. 2005100840791: Notification of the Second Office Action dated Aug. 8, 2008.
CN Application No. 2005100840791: Patent Certificate for invention: Announced Jul. 15, 2009.
EP Application No. 05 005216.6: EPO Communication dated Nov. 13, 2009.
EP Application No. 05 005216.6: EPO Communication dated Feb. 13, 2007.
EP Application No. 05 005216.6: European Search Report dated Oct. 21, 2005, transmitted in Communication of Nov. 10, 2005.
JP Application No. 2005-134928: Official Action dated Oct. 5, 2010 with English translation.
JP Application No. 2005-134928: Interrogation on Appeal dated Apr. 27, 2010 with an Appeal, Claims on Appeal and English translation of same.
JP Application No. 2005-134928: Notification of Reasons for Refusal dated Jan. 6, 2009.
EP Application No. 05 025646.0: EPO Communication dated Dec. 16, 2008.
JP Application No. 2006-30436; Official Action dated Oct. 5, 2010 with English translation.
TW Application No. 094141622: Office Action of the IPO dated Sep. 23, 2008.

JP Application No. 2006-015765: Decision on Appeal Trial (Feb. 23, 2010) with partial English Translation & English translation of claims on appeal.
U.S. Appl. No. 11/087,179: Office Action dated Apr. 2, 2010.
U.S. Appl. No. 11/087,179: Office Action dated Jan. 25, 2011.
U.S. Appl. No. 11/102,429: Office Action dated May 14, 2010.
U.S. Appl. No. 11/102,429: Office Action dated Dec. 8, 2010.
U.S. Appl. No. 11/551,957: Office Action dated Mar. 23, 2010.
U.S. Appl. No. 11/551,957: Office Action dated Nov. 15, 2011.
U.S. Appl. No. 11/051,196: Office Action dated Dec. 8, 2009.
JP Application No. 2005-134928: Appeal Trial Decision dated May 12, 2011.
JP Application No. 2006-30436: Appeal Trial Decision dated Oct. 11, 2011.
CA Application No. 2,407,813: Official Action dated Nov. 21. 2011.
CA Application No. 2,580,041: Examiner's Report dated Sep. 9, 2011.
EP Appiication No. 07103523.2: EP Communication dated May 5, 2011.
CA Application No. 2,518,125: Official Action Dated Mar. 10, 2011.
EP Application No. 11005096.0: Extended European Search Report dated Oct. 27, 2011.
R. Streit et all: "High efficiency tetecom rectifier using a novel soft-switched boost-based input current shaper", 1991, INTELECT 91—IEEE, XPO09070017, p. 724, right-hand column, paragraph 3—p. 725, left-hand column, paragraph 1: figures 7, 8.
H. Bodur et al. "A new ZVT-ZCT-PWM DC-DC converter", IEEE Transactions on Power Electronics, vol. 19, No. 3. 2004, pp. 576-684, XP002391953.
Image File Wrapper (IFW) of co-pending U.S. Appl. No. 11/102,429.
IFW of co-pending U.S. Appl. No. 11/551,957.
IFW of co-pending U.S. Appl. No. 11/051,196.
IFW of co-pending U.S. Appl. No. 11/087,179.

* cited by examiner

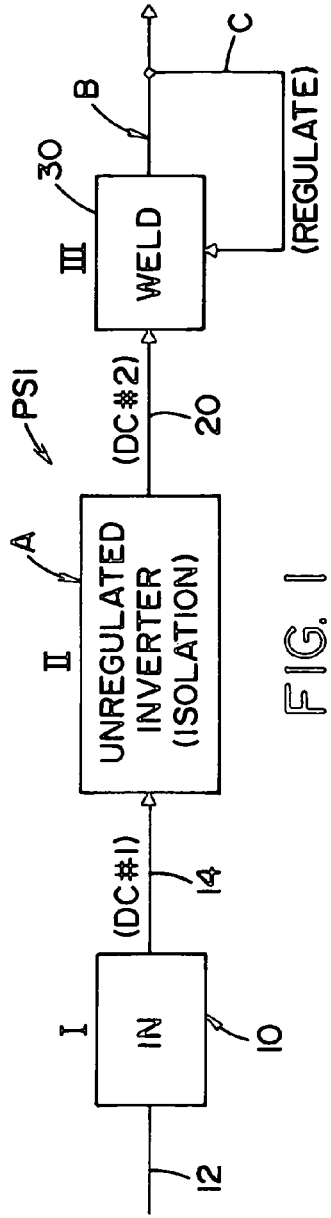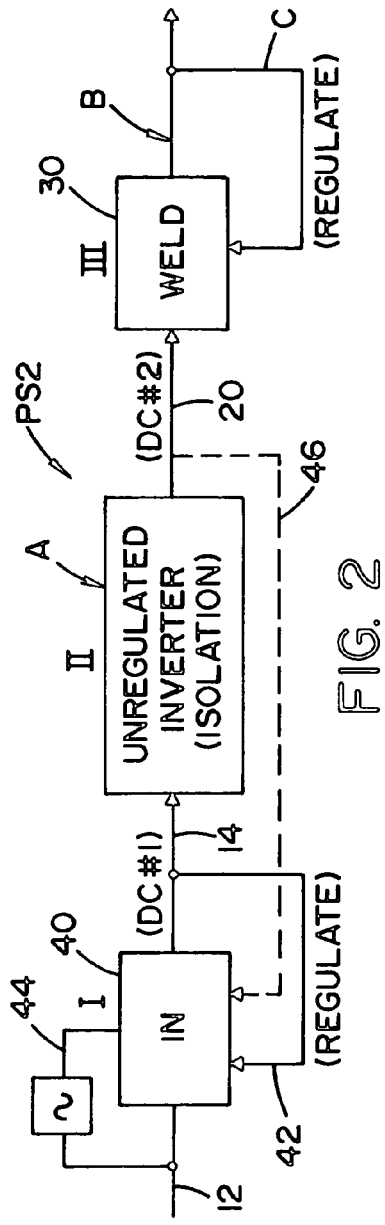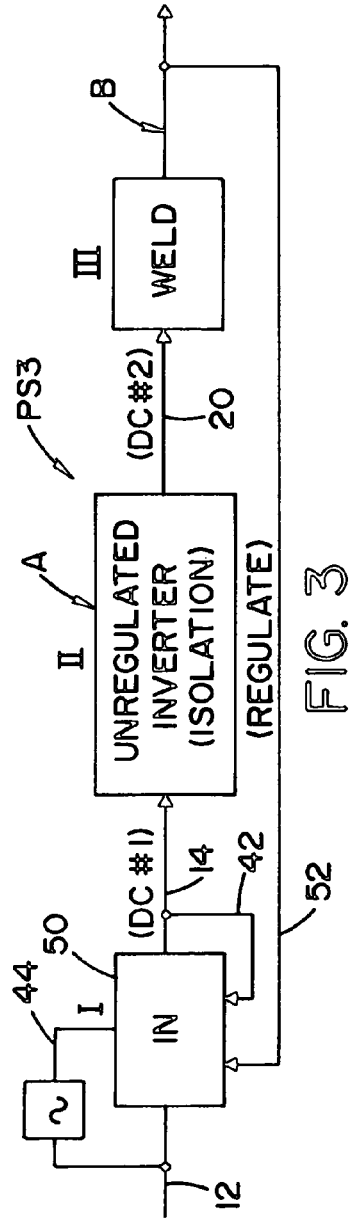

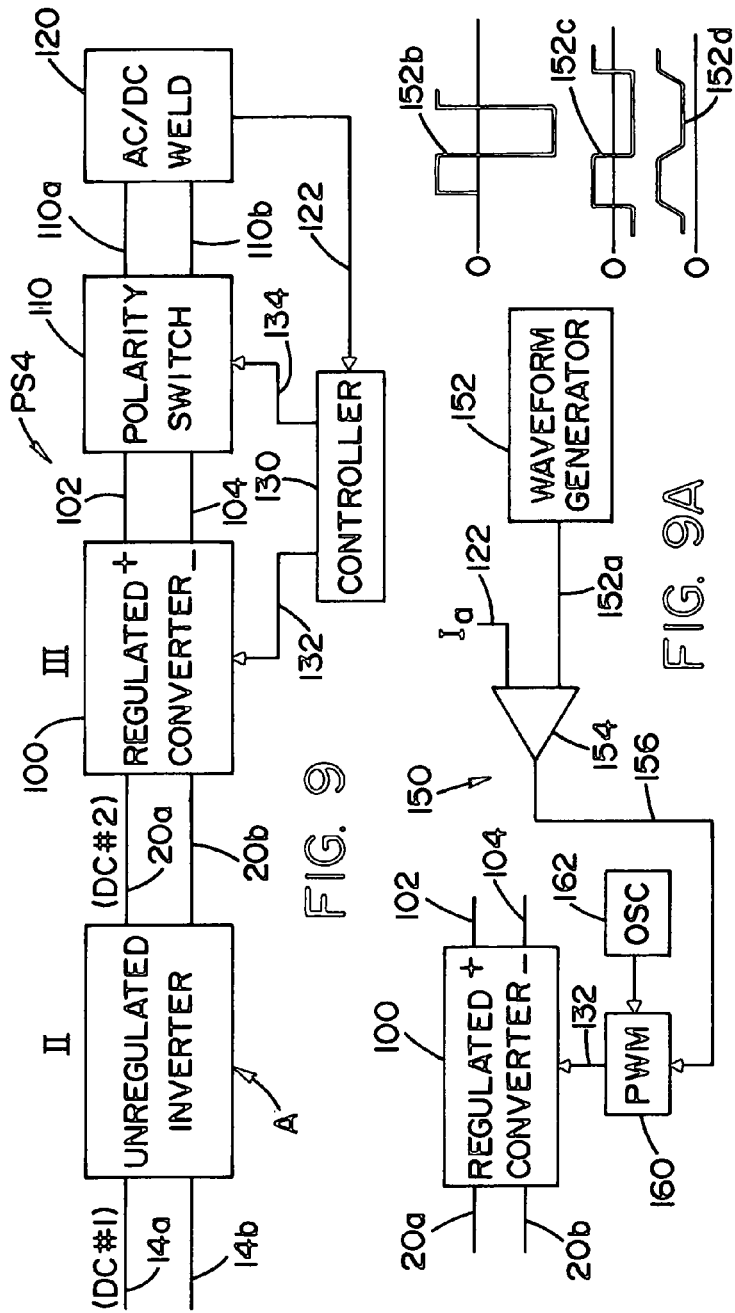

POWER SOURCE FOR ELECTRIC ARC WELDING

The invention relates to the field of electric arc welding and more particularly to a power source for such welding and the method implemented by use of the novel power source.

INCORPORATION BY REFERENCE AND BACKGROUND OF INVENTION

Electric arc welding involves the passing of an AC or DC current between a metal electrode and a workpiece where the metal electrode is normally a cored metal wire or solid metal wire. A power source is used to create a given current pattern and/or polarity between the advancing electrode wire and workpiece so that the arc will melt the end of the advancing welding wire and deposit the molten metal on the workpiece. Although various converter technologies are used for power sources, the most effective is an inverter based power source where a switching network includes switches operated at high frequency to create the desired waveform or current level for the welding process. An inverter type power source is discussed in Blankenship U.S. Pat. No. 5,278,390 where the inverter is operated in accordance with the preferred embodiment of the present invention. This preferred operating procedure involves "waveform control technology" pioneered by The Lincoln Electric Company of Cleveland, Ohio where the actual waveform is generated by a series of short pulses created at a frequency generally above 18 kHz and the group of short pulses has a profile controlled by a waveform generator. This well known type of inverter control technique is used in the preferred embodiment of the present invention and need not be described in more detail. In accordance with standard power source technology, the input signal to the inverter stage of the power source is rectified current from a sine wave power supply. An appropriate power factor correcting converter is common practice and is either a part of the inverter switching network itself, as shown in Kooken U.S. Pat. No. 5,991,169, or is located before the inverter stage, as shown in Church U.S. Pat. No. 6,177,645. Indeed, a power source with a power factor correcting converter or stage has been known in the welding art for many years. Another power source employing an input power factor correcting converter in the form of a boost converter is shown in Church U.S. Pat. No. 6,504,132. The two patents by Church and the patent by Kooken are incorporated by reference herein as background information and technology to which the present invention relates. In both Kooken U.S. Pat. No. 5,991,169 and Church U.S. Pat. No. 6,504,132 the actual welding current is regulated by an output chopper or buck converter and isolation is obtained by a transformer either in the output of the inverter stage or in the output of the input boost converter. These various topologies for power sources are common knowledge in arc welding technology. In these prior art patents, the actual welding current, voltage or power is regulated in or before the output stage of the power source, which output stage is either an inverter or a chopper. Neither the inverter, nor the chopper is unregulated to produce a fixed, lower voltage DC bus for driving a regulated welding stage as anticipated by the present invention.

Isolation of the welding operation is a characteristic of most power supplies for welding. The term "welding" includes "plasma cutting." In Vogel U.S. Pat. No. 5,991,180, a preregulator using a boost converter is directed to a converter which is disclosed as a chopper having an output isolation transformer located after welding regulation and directly driving the welding operation. In this power source, the chopper network is controlled to create the desired regulated output welding current and isolation is provided in the output stage. In a like manner, Thommes U.S. Pat. No. 5,601,741 discloses a boost converter for driving a pulse width modulated controlled inverter providing the regulated output signal to the actual welding operation. In both Vogel and Thommes, the second stage is regulated to direct the power factor controlled current from a preregulator into a welding operation. Welding regulation is in the second stage and is normally driven by a pulse width modulator control circuit. Both Vogel and Thommes are incorporated by reference herein as background technology. In Moriguchi U.S. Pat. No. 6,278,080 an inverter type power source is regulated to control the desired welding current. Isolation is obtained by a transformer between the controlled second stage inverter and the welding output which is disclosed as a DC welding operation. A similar power source is shown in Moriguchi U.S. Pat. No. 5,926,381 and Moriguchi U.S. Pat. No. 6,069,811 wherein the isolation of the control current from the inverter stage is at the output of the inverter and directly drives the welding operation. Moriguchi U.S. Pat. No. 5,926,381 discloses the common arrangement for using the voltage at the output of the first stage boost converter to provide the controller voltage for either the regulated inverter stage or the boost converter itself. The three Moriguchi patents are incorporated by reference herein as background information showing the prior art power source where a regulated inverter is driven by an input boost converter or a DC output of a rectifier to produce a controlled welding current directed to an output transformer used for isolation. The secondary AC signal of the isolation transformer is directly used for the welding operation. There is no third stage topology as used in the novel power source of the invention.

Turning now to non-welding technology, an aspect of the invention is the use of a synchronous rectifier device at the output of a DC/DC second stage converter. Synchronous rectifiers are common practice and one such rectifier is illustrated in Boylan U.S. Pat. No. 6,618,274. Calkin U.S. Pat. No. 3,737,755, discloses a DC/DC converter for low power use where a fixed regulated current is directed to a non-regulated inverter to provide a non variable output DC signal. Any control of the non-regulated inverter is at the input side of the inverter so that the input DC signal is the only parameter that can be regulated to control the fixed output DC signal of the inverter. This is a topography that requires a control of the signal to the inverter so that the inverter provides a controlled fixed output signal. This is a different concept than anticipated by use of the present invention; however, the non-welding general background technology in Boylan and Calkin is incorporated by reference herein to show a synchronous rectifier and a version of a non-regulated inverter where any regulation is performed before the inverter by controlling the level of the input DC signal. Neither of these patents relate to a power source for welding and are only incorporated by reference as general technical concepts, such as synchronous rectifier devices and unregulated inverters. A non-welding two stage AC to DC converter is shown in Smolenski U.S. Pat. No. 5,019,952 for imparting minimum harmonic distortion to the current flowing into the converter. The load is not variable and does not require regulation as demanded in a welding operation. This patent is incorporated by reference to show general technology not related in any way to the demands of a power source for electric arc welding.

These patents constitute the background of the invention relating to a power source that must be regulated by a welding operation where such regulation is by a feedback loop of average current, average voltage, and power of the actual welding operation. Fixed load power sources are not relevant to the invention, except as general technical information.

In the past, an inverter in a power source outputted a welding current regulated by a parameter in the welding operation, such as current, voltage or power. This inverter was normally controlled by a pulse width modulator wherein the duty cycle of the switches operated at high frequency was controlled by the feedback from the welding operation so that the duty cycle was adjusted in a range substantially less than 100%. This type of PWM controlled inverter is referred to as a regulated single stage inverter. Such inverter formed the output of the power source and was the last stage of the power source. Lower duty cycles resulted in higher primary currents and more losses. The efficiency of the inverter varied according to the duty cycle adjustment caused by the requirement of regulating the output of the single stage inverter to create an output signal suitable for welding. Using a power source where the final stage is a regulated single stage inverter resulted in heat losses, lower efficiency, high cost and increased component size. For these reasons, some welding source manufacturers have marketed power sources as being better than an inverter power source because they do not use inverters with the resulting high cost and other difficulties. An inverter stage which had the dual function of isolating the output and regulating the current for the purposes of creating a current suitable for welding was to be avoided. See Hoverson U.S. Pat. No. 6,723,957, incorporated by reference herein as background.

THE PRESENT INVENTION

The present invention relates to a power source for electric arc welding (plasma cutting) wherein the inverter of the power source is a second stage as in the past, but is unregulated so that a third stage can be added to provide the actual regulation for creating a current suitable for welding. By using this three stage concept, the inverter can operate at a very high frequency of switching whereas the output third stage can be a chopper operated at a lower frequency of switching. Consequently, the switching frequency is optimized by the function performed by the stage as opposed to the need for using high frequency in a pulse width modulated inverter stage used for actual regulation of the output welding current. Furthermore, the isolated, fixed DC voltage to the regulated third stage can be substantially lower than the DC voltage from the input converter stage and much higher than the actual welding output voltage.

The invention involves a novel topography for a power source wherein the pulse width modulated inverter is merely a second stage for creating an isolated fixed output DC bus without a feedback signal to the second stage pulse width modulated inverter. This isolated bus is used in a third stage regulated by the actual welding parameters to create a current suitable for welding. Consequently, the invention involves an unregulated second stage not only providing necessary isolation but also to producing a fixed DC output bus to be used by a third stage wherein welding regulation is accomplished. The unregulated second stage inverter is operated at a very high frequency with a duty cycle that is fixed during operation of the power source. The frequency is over 18 kHz and preferably about 100 kHz. The duty cycle is fixed at various levels; however, the preferred duty cycle is close to 100% to give the maximum efficiency level obtained by use of the present invention. The use of a fixed, high duty cycle minimizes the current circulation time of the phase shift modulator controlled inverter second stage to substantially reduce heat an increase efficiency. In accordance with an aspect of the invention, the output of the second unregulated inverter stage is a rectifier using well known synchronous rectifier devices, which devices are controlled by the secondary winding of the internal isolation transformer of the second stage unregulated inverter. By using synchronous rectifier devices at the output of the second stage, there is further improvement in the total efficiency of the power source. By using the present invention, the first stage is either an input rectifier or an input rectifier with a power factor correcting converter. A first stage power factor correcting converter is preferred. This converter is after a standard rectifier or can be combined with the rectifier. Of course, this converter can be a passive power factor correcting converter or an active converter such as a boost, buck or buck+boost converter. The first stage of the invention produces a first DC bus with a fixed voltage. By using a standard first stage for the power source, the first DC output signal which is the input DC bus to the unregulated inverter can be regulated and fixed at a value of about 400-900 volts DC. The output of the unregulated, isolation inverter forming the second stage of the novel power source is a fixed DC bus having a fixed relationship with the input DC bus from the first stage. The voltage of the second DC bus or output is substantially less than the voltage of the DC bus from the first stage. The power source thus produces a second DC bus which has a fixed mathematical relationship with the input DC bus from the power factor correcting converter. In accordance with standard practice, the second stage unregulated inverter includes an isolation transformer having a primary winding and a secondary winding so that the secondary winding is isolated from the input of the power source. The unregulated, second stage inverter can be operated at a switching frequency to optimize the operation of the second stage inverter. Thus, extremely high switching frequency is used to reduce the size and cost of the components in the novel, unregulated second stage inverter. By utilizing a fixed duty cycle with phase shift control, voltage and current surges in the switching devices are reduced to provide a soft switching operation. Indeed, in the preferred embodiment, the duty cycle is fixed at 100% so that the switches are full on or full off. This drastically reduces the circulated current in the second stage and greatly improves the operating characteristics of the second stage inverter which also provides the function of isolating the welding output of the power source from the AC input of the power source. By having the switching devices in the second stage unregulated inverter operated at full on, this inverter has a high efficiency and is very flexible in operation. An isolation transformer determines the relationship between the fixed DC bus at the input side of the unregulated second stage (a "first DC output signal" from the first stage) and the DC output bus at the output of this second stage (a "second DC output signal"). In some prior art power sources, the duty cycle at the primary winding of the isolation transformer in the regulated inverter is regulated by the welding operation. There is no regulation by the welding operation in either the first stage or second stage of the novel power source used in the present invention.

The present invention involves a three stage power source where the second stage is unregulated isolation stage and the third stage is a regulated device, such as an inverter or chopper. A chopper with a switching frequency less than the second stage inverter is preferred and is used in the practical implementation of the present invention. The chopper better controls the output welding characteristics of the power source. An inverter with an unregulated isolation stage followed by a chopper stage provides a more efficient power source than a single stage (regulated) inverter, as used in prior art inverter based power sources. A power source where the second stage is an inverter has a maximum output that is at least twice the rated operating voltage of the inverter. When there are only two stages, a single stage regulated inverter forms the second and last stage and runs at 50% or less energy transfer time. Therefore, the inverter of a prior art two stage power source requires at least twice the primary current than the novel three stage power source of the invention. The unregulated isolated stage of the present invention has a higher efficiency even though it uses the same transformer turn ratio. This is especially important when the second stage is running at full on or 100% duty cycle. Consequently, the present invention drastically increases the energy transfer time and reduces primary current of the isolation transformer in the second stage of an inverter based power source used for electric arc welding.

Normal control of an inverter in a power source used for welding is a phase-shift PWM control where the conduction states of the leading and lagging switches of the primary side have overlap that determines the energy transfer time of the inverter. The primary current has to circulate during the non-transfer time in order to achieve soft switching. Therefore, the primary side of the unregulated inverter used in the invention is more efficient than that of the single stage regulated inverter used in the prior art, due to a small amount of off time and less primary current in the unregulated inverter. This is an advantage of using the present invention. Furthermore, the switching frequency of the inverter isolation stage, or second stage, is preferably much higher than the switching frequency of the output chopper third stage when using the present invention. The switching loss in the IGBT, and the diodes of the chopper used in the present invention is less than the loss in the output rectifier diodes of the single stage inverter used as the second, regulating stage of a standard inverter based power source. The unregulated second stage, as used in the present invention, is preferably a full bridge inverter; however, various other inverter designs can be employed, especially dependent upon the voltage at the primary side DC bus. The preference is to use 600 volt IGBT switches for either 450 volt bus or two 450 volt buses in series. Since the second stage inverter has no control feedback and is driven at full on regardless of the output load demand, the secondary bus voltage is always equal to the primary bus voltage divided by the transformer turn ratio. This is another advantage of using the three stage inverter based power source for electric arc welding wherein the second stage is an unregulated inverter and the third stage is the regulated device, preferably a chopper but alternatively is an inverter.

The energy loss in the secondary of the unregulated inverter is about twice as much as the energy loss on the primary side when standard diodes are used for the output rectifier of the second stage. The reason for this higher loss is that the secondary current is substantially greater than the primary current when the isolation transformer has a turn ratio with the primary turns substantially greater than the secondary turns. Thus, loss in the output rectifier is much higher than the conduction loss in the primary switches of the second stage inverter. To reduce this situation, an aspect of the invention is the use of very low on-resistance FETs configured as synchronous rectifier devices. The use of synchronous rectifier devices in the output of the second stage reduces the conduction loss in the secondary side of the inverter. Diodes in the secondary side are hard switched even though the switches in the primary side are soft switched. Soft switching is by phase-shift control of the switches in the primary side of the second stage inverter. The reverse recovery current experiences more loss in the secondary diodes than the on-resistance loss when the second stage inverter is switched at a frequency above 100 kHz. Therefore, it is also desirable to use synchronized rectifier devices to reduce switching losses by having a time delay between the primary switching control and the secondary synchronous rectifier control. The ability to use this concept is an advantage of using synchronous rectifier devices in the output rectifier on the secondary side of the inverter forming the second stage of the three stage power source of the present invention. In addition, the use of synchronous rectifier devices in the secondary side of the inverter reduces the energy loss experienced in the total transfer of power from the input DC bus to the output DC bus of the second stage. It has been established that the control of the synchronous rectifier is simplified if the second stage unregulated inverter is used to run full on at all times. This is the normal operating condition of the unregulated inverter used as the second stage in the novel power source of the present invention. The secondary voltage in the unregulated inverter is used to generate the gate driving signals for the synchronous rectifier devices by connecting the devices to opposite ends of the secondary winding of the isolation transformer used in the second stage unregulated inverter of the invention. Comparing synchronous rectifier devices to standard diodes, the synchronous rectifier devices may with low-resistance FETs reduces the energy lost in the secondary side of the unregulated inverter. This reduction is as great as 50%.

A power source for electric arc welding having an active power factor correcting feature and tight output control of the energy directed to the welding operation requires at least two switching stages. These two stages assure that instantaneous energy transferred into the power source and transferred out the power source can be regulated independently with appropriate energy storage components. Thus, a power factor correcting power source for electric arc welding generally requires two independent switching control circuits. One of the control circuits is used to control the energy or the output current for the welding operation. The other control circuit is used to control the DC signal from the active power factor correcting converter forming the first stage of the power source. Thus, electric arc welding power sources having power factor correcting capabilities requires two switching networks each of which has independent control requirements. The first switching control is for the output welding current and the other switching control is for power factor correcting at the input stage of the power source. This second switching control assures that the output of the first stage is a fixed DC voltage referred to as a "DC bus." The voltage of the DC bus itself is used to control the first stage converter to assure that the DC bus from this converter has a fixed voltage level. To recapitulate an inverter based power source for electric arc welding requires two separate switching networks and two control circuits for these networks.

An inverter based power source for electric arc welding has another conceptual requirement. One of the stages in the power source must provide electrical isolation between the variable input AC signal and the regulated output current suitable for welding. The isolation device is normally in the form of a transformer. In prior art, two stage inverter based power sources there are two locations for the isolation device. In the first example, the power factor correcting input stage is not isolated and an isolation transformer is provided in the second stage regulated output inverter. In another example, isolation is in the first stage power correcting converter. In this second example, a non-isolation output inverter or other non-isolation converter can be used as the second stage. The first example is more efficient than the second example due to 60 Hz effect on the RMS current at the input side of the power source. In recapitulation, the second conceptual requirement of a welding power source is isolation.

The two requirements of an active power factor correcting power source for welding are (a) two separate and independent control circuits for two separate switching networks and (b) an appropriate structure for isolating the input of the power source from the output of the power source. These basic requirements of inverter based power sources are implemented in the present invention. When an unregulated inverter is used, the unregulated second stage is an isolation stage between two regulated non-isolation stages to form a unique arrangement involving a three stage inverter based power source. The three stage inverter of the present invention is more efficient than the two stage inverter based power source assuming the same power factor correcting preregulator is used in both inverters. Thus, the present invention is more efficient, but still has the essential characteristics required for a power source used in electric arc welding. There are two independently controlled switching networks. There is an isolation stage. These constraints are accomplished in a manner to increase efficiency and obtain better welding performance and better heat distribution of the power switching components.

Since the second unregulated inverter stage of the present invention provides system isolation, many types of non-isolated converters can be used as the power factor correcting preregulator. A boost converter is the most popular converter due to the current shaping function and the continuous line current characteristics of this type of conversion. However, the output voltage of the boost converter is higher than the peak of the highest line voltage, which peak can be as high as 775 volts. Thus, other active power factor correcting regulators can be used with the invention, which is a three stage power source wherein the second stage is unregulated and provides isolation. One of the other options for the active power factor correcting input or first stage is a step-up/step-down converter so that the primary voltage bus or input bus to the second stage can be lower than the peak of the input AC voltage signal to the power source. This type of power factor correcting converter still produces low harmonics. One such power factor converter is referred to as a buck+boost converter. A 400 volt to 500 volt DC bus used for the second stage is obtained with an input AC voltage in the range of 115 volts to 575 volts. Irrespective of the AC voltage to the first stage, the output voltage of the active power factor converter is controlled to be at a level between 400 volts and 500 volts. Other types of active and passive power factor correcting inverters can be used in the invention. The preferred converter is active thus constituting a second switching network requiring a second control circuit. When using the term electric arc welding, it also includes other output processes, such as plasma cutting.

As so far explained, the invention involves a three stage power source for electric arc welding. A feedback control in the third stage creates an output current suitable for welding. The input first stage is normally an active power factor correcting converter requiring a second switching network and a second independent control circuit. This three stage topography is not used in the prior art. By having this topography, the added second stage is merely used to convert the high voltage DC bus at the primary side of the second stage to a lower voltage DC bus at the secondary side of the second stage isolated from the primary side. Thus, the invention involves a DC bus at the secondary side of the second stage so that the bus can be used for regulation of welding power. The term "bus" means a DC signal that has a controlled fixed level. In the present invention, there is a first DC bus from the input stage called the "first DC output" which first DC output has a controlled DC voltage. There is a second DC bus at the secondary side of the second stage called the "second DC output" which second DC output is also a controlled DC voltage level. The creation of a second DC bus at the secondary side of an unregulated inverter has advantages, other than the advantages associated with the use of the unregulated second stage inverter as so far described. The secondary DC bus or second DC output is isolated from the primary side of the second stage so that there is no isolation required in the third stage welding control circuit. In other words, the output control circuit, such as a chopper, has an input DC bus with a fixed voltage level. In practice, the chopper has a controller with a control voltage that is derived from the input DC to the chopper. This input DC signal is isolated from the input power. Consequently, the control voltage for the controller of the output stage or chopper can be derived from a non-isolated DC source. This is normally the input signal to the chopper. Separate isolation of the control voltage for the controller used in the output stage is not required. The use of a fixed DC bus from the second stage allows the DC voltage to the output third stage, which is regulated by the welding operation, to be much lower than the normal input primary DC bus ("first DC output") of the power source. In the past, the output of the power factor converter is a relatively high level DC signal based upon the use of a boost converter. This high DC voltage was directed to the regulated inverter stage for use in outputting a current suitable for the welding. By using the present invention the high voltage from the output bus of the power factor converter is drastically reduced. It is more efficient to convert a 100 volt DC bus into a 15 volt control power than to convert a 400 volt DC bus to a 15 volt control power. This creation of a second, lower voltage DC bus is a substantial advantage of the three stage power source of the present invention.

In accordance with the present invention there is provided a power source for an electric arc welding process wherein the power source comprises an input stage having an AC input and a first DC output signal. A second stage in the form of an unregulated DC to DC converter has an input connected to the first DC output signal and an output in the form of a second DC output signal electrically isolated from the first DC output signal with a magnitude of a given ratio to the first DC output signal. The power source includes a third stage to convert the second DC output signal to a welding current for the welding process. In accordance with another aspect of the present invention there is provided a power factor correcting converter as the first stage of the novel three stage power source. The third stage of the power source includes a regulated converter such as a chopper or inverter. When using an inverter, the output is a DC signal directed to a polarity network or switch, which switch allows DC welding by the power source. The polarity switch allows welding either DC negative, DC positive or AC. The welding process, using either a chopper or an inverter, can be performed with shielding gas, such as MIG welding, and can use any type of electrode, such as tungsten, cored wire or solid metal wire. In accordance with an aspect of the invention, the output of the unregulated DC to DC converter is substantially less than the input to the second stage. In most instances, the input and output of the second stage are DC voltages with generally fixed magnitudes.

The present invention relates to a three stage power source for electric arc welding wherein the first stage is normally regulated to produce a fixed first DC signal or "first DC output." This first fixed DC signal, DC bus or DC output is connected to the primary side of a second stage unregulated inverter, wherein the secondary side of the inverter is a fixed DC output signal directed to an output third stage. The third stage has a regulated switching network for creating a current suitable for welding. The regulated third stage is controlled by a feedback loop from the welding operation to control the welding operation by current, voltage or power.

In accordance with another aspect of the invention, the switching frequency of the unregulated inverter constituting the second stage of the power source is substantially greater than 18 kHz. Indeed, the switching frequency of the second stage is substantially greater than the switching frequency of the regulated third stage of the power source and is normally about 100 kHz. In this manner, smaller components are used in the second stage of the three stage power source.

The primary object of the present invention is the provision of a three stage power source for electric arc welding, which power source is efficient in operation, has a better welding performance and is more robust.

Still a further object of the present invention is the provision of an electric arc power source as defined above, which electric arc power source has a second stage where a DC bus is converted to a DC bus through an isolation transformer without regulation of the conversion.

Another object of the present invention is the provision of a method for converting an AC signal into a DC current suitable for welding which method involves rectifying and converting said AC input into a DC signal called a first DC output. The DC signal is converted to an isolated DC bus and then used to power a regulated stage controlled by the parameters of a welding operation to produce a current suitable for welding.

Another object of the present invention is the provision of a power source and method, as defined above, which power source and method uses a high switching frequency above 18 kHz and about 100 kHZ with a fixed duty cycle to prevent losses.

Yet another object of the present invention is the provision of a power source for electric arc welding and method, as defined above, which power source and method have reduced magnetic losses, reduced component sizes, and provides an efficient power source for electric arc welding.

Still a further object of the present invention is the provision of a power source for electric arc welding and method of using same, which power source and method involves an unregulated DC to DC converter providing isolation so the output stage regulated for welding need not include an isolation feature.

Another object of the present invention is the provision of a power source for electric arc welding and a method of using the same, which power source and method includes a DC to DC unregulated inverter where the output of the inverter is much lower in voltage than the input to the inverter. Thus, the efficiency is increased due to outputting a lower voltage that needs to be converted to a welding voltage.

These and other objects and advantages will become apparent from the following description taken together with the accompanying drawings.

BRIEF DESCRIPTION OF DRAWINGS

FIG. 1 is a block diagram illustrating a three stage power source and disclosing an embodiment of the invention;

FIG. 2 and FIG. 3 are block diagrams similar to FIG. 1 disclosing further embodiments of the invention;

FIG. 9 is a block diagram showing the last two stages of a power source constructed in accordance with the present invention wherein the output stage provides AC welding current;

FIG. 9A is a block diagram of a waveform technology control circuit for use in the embodiment of the invention illustrated in FIG. 9 and usable in various implementations of the present invention together with graphs showing three welding waveforms;

FIG. 10 is a block diagram illustrating a second and third stage of a power source constructed in accordance with the present invention wherein the output stage is DC welding current;

PREFERRED EMBODIMENT

Figure 4:
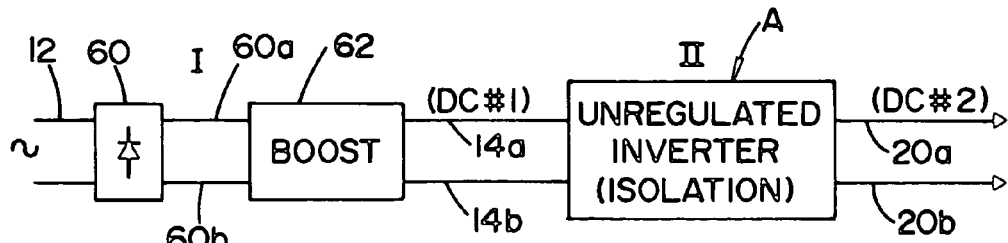
FIGS. 4-8 are partial block diagrams illustrating a power source constructed in accordance with the invention and disclosing different first stage embodiments.

The present invention relates to a three stage power source for use in electric arc welding. Of course, the concept of welding also encompasses the related technology of plasma cutting. The invention has an input stage for converting an AC signal into a first DC output bus. This output bus has a fixed voltage level in accordance with the preferred embodiment of the invention and is directed to the input of a novel second stage used in the welding technology and best shown in FIG. 16. This novel second stage is an unregulated inverter which includes an isolation feature and has a second DC output or second DC bus which is proportional to the DC input bus. The level relationship is fixed by the construction of the unregulated inverter. The unregulated inverter has a switching network wherein the switches are operated at a high switching frequency greater than 18 kHz and preferably about 100 kHz. The switching frequency of the switch network in the unregulated inverter forming the second stage of the power source allows use of small magnetic components. The isolated DC output of the unregulated inverter is directed to a third stage of the power source. This third stage is either a chopper or inverter which is regulated by a welding parameter, such as current, voltage or power of the welding operation. Consequently, the topography of the present invention has an input stage to produce a first DC signal, a second unregulated DC to DC stage to provide an isolated fixed DC voltage or DC bus that is used by the third stage of the power source for regulating the current used in the welding operation. Three examples of the present invention are illustrated in FIGS. 1-3. Power source PS1 in FIG. 1 includes first stage I, second stage II, and third stage III. In this embodiment, stage I includes an AC to DC converter 10 for converting AC input signal 12 into a first DC bus 14. The input 12 is an one phase or three phase AC line supply with voltage that can vary between 400-700 volts. Converter 10 is illustrated as an unregulated device which can be in the form of a rectifier and filter network to produce DC bus 14 identified as (DC#1). Since the AC input signal is a line voltage, DC bus 14 is generally uniform in magnitude. Unregulated inverter A is a DC to DC converter with an isolation transformer to convert the DC bus 14 (DC#1) into a second DC bus or second DC output 20 (DC#2). Output 20 forms the power input to stage III which is converter 30. The DC voltage on line 20 into a current suitable for welding at line B. A feedback control or regulation loop C senses a parameter in the welding operation and regulates the current, voltage or power on line B by regulation of converter 30. In practice, converter 30 is a chopper, although use of an inverter is an alternative. By having a three stage power source PS1 as shown in FIG. 1, the switching network of the second stage has a frequency that is normally higher than the switching frequency of converter 30. Furthermore, the DC voltage in line 20 (DC#2) is substantially less than the DC voltage from stage I on line 14 (DC#1). In practice, there is an isolation transformer in inverter A. The transformer has an input or primary section or side with substantially more turns than the secondary section or side used to create the voltage on line 20. This turn ratio in practice is 4:1 so that the voltage on line 20 is ¼ the voltage on line 14.

The general topography of the present invention is illustrated in FIG. 1; however, FIG. 2 illustrates the preferred implementation wherein power source PS2 has essentially the same stage II and stage III as power source PS1; however, input stage I is an AC to DC converter 40 including a rectifier followed by a regulated DC to DC converter. The converted signal is a DC signal in line 14 shown as a first DC bus (DC#1). The voltage on line 14 is regulated as indicated by feedback line 42 in accordance with standard technology. Thus, in power source PS2 the output welding converter 30 is regulated by feedback loop C. The voltage on line 14 is regulated by feedback loop shown as line 42. Since converter 40 is a power factor correcting converter it senses the voltage waveform as represented by line 44. By using power source PS2, the first DC bus 14 is a fixed DC voltage with different one phase or three phase voltages at input 12. Thus, output 20 is merely a conversion of the DC voltage on line 14. DC#2 is a fixed voltage with a level determined by the isolation transformer and the fixed duty cycle of the switching network in unregulated inverter A. This is the preferred implementation of the novel power source employing three separate and distinct stages with stage II being an unregulated inverter for converting a fixed first DC output or DC bus to a second fixed DC output or DC bus used to drive a regulated welding converter, such as a chopper or inverter. As another alternative, stage I could be regulated by a feedback from the DC #2 bus in line 20. This is represented by the dashed line 46 in FIG. 2.

Power source PS3 in FIG. 3 is another implementation of the three stage power source contemplated by the present invention. This is not the preferred implementation; however, the three stage power source of the present invention can have the input converter 50 regulated by feedback loop 52 from the welding current output B. With this use of a three stage power source, converter 50 is regulated by the welding output and not by the voltage on line 14 as in power source PS2. With regulation from welding output B, converter 50 is both a power factor correcting stage and a welding regulator. However, this implementation of the invention is disclosed for a complete technical disclosure of the three stage power source as contemplated by the present invention.

Figure 5:
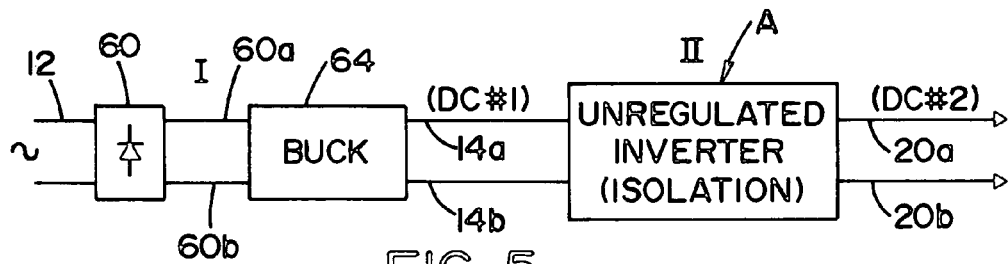
Figure 6:
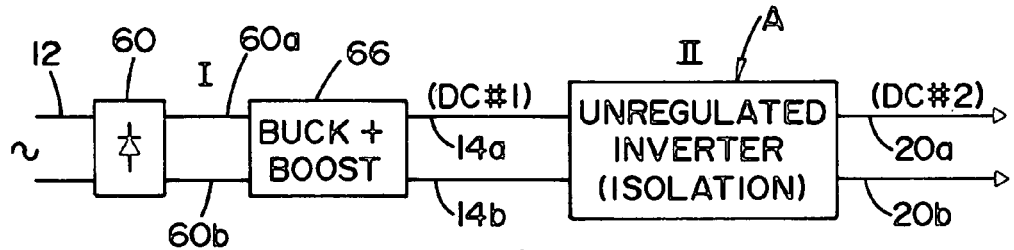
Figure 7:
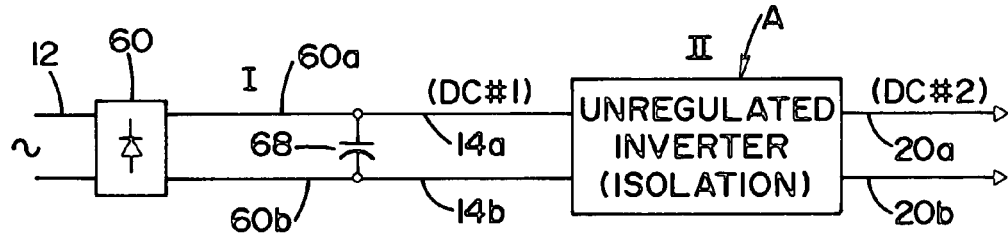
Figure 8:
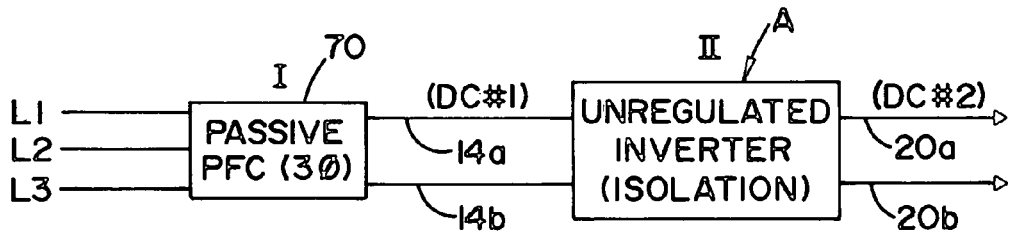

As previously described, input stage I converts either a single phase or a three phase AC signal 12 into a fixed DC bus 14 (DC#1) for use by the unregulated inverter A constituting second stage II. The implementation of the present invention generally employs a DC to DC converter in stage I to produce the DC voltage indicated as line 14 in FIGS. 1-3. The DC to DC converter of stage I can be selected to create the desired voltage on line 12. Three of these converters are shown in FIGS. 4-6 wherein an input rectifier 60 provides a DC voltage in lines 60a, 60b to a DC to DC converter which may be a boost converter 62, a buck converter 64 or a buck+boost converter 66, as shown in FIG. 4, FIG. 5 and FIG. 6, respectively. By using these converters, the DC to DC converter of stage I incorporates a power factor correcting chip, which chip allows the power factor to be corrected thereby reducing the harmonic distortion at the input of the power source. The use of a power factor correcting input DC to DC converter is well known in the welding art and is used in many prior art two stage topographies. The present invention is a substantial improvement over such two stage power sources. Converters 62, 64 and 66 preferably include a power factor correcting chip; however, this is not required for practicing the invention. The main purpose of stage I is to provide a DC bus (DC#1) in line 12, which bus is indicated to be lines 14a, 14b in FIGS. 4-6 to produce a fixed DC bus (DC#2) in line 12 indicated by lines 20a, 20b in the same figures. Power factor correction is not required to take advantage of the three stage topography of the present invention. A non power factor correcting input stage is illustrated in FIG. 7 where the output lines 60a, 60b of rectifier 60 are coupled by a large storage capacitor 68 to produce a generally fixed voltage in lines 14a, 14b. Stage I in FIG. 7 does not incorporate a power factor correcting circuit or chip as preferred in implementation of the present invention. However, the power source still involves three stages wherein the second stage is unregulated isolated inverter A to produce a generally fixed voltage on lines 20a, 20b. Another modification of input stage I is illustrated in FIG. 8 where a passive power factor correcting circuit 70 is connected to a three phase AC input L1, L2 and L3 to produce a generally fixed DC voltage across lines 14a, 14b, which lines constitutes the DC bus 14 (DC#1) at the input of inverter A. The disclosures of modified stage I in FIGS. 4-8 are only representative in nature and other input stages could be used in practicing the invention with either single phase or three phase input signal and with or without power factor correcting.

By providing low fixed voltage on output bus 20 illustrated as lines 20a, 20b, the third stage of the novel three stage power source for welding can be a chopper or other converter operated at a frequency greater than 18 kHz. The switching frequencies of the unregulated inverter and the regulated output converter may be different. Indeed, normally the switching frequency of the chopper is substantially less than the frequency of unregulated inverter A. Power source PS4 shown in FIG. 9 illustrates the use of the present invention wherein stage III is a standard regulated converter 100 of the type used for electric arc welding. This converter is driven by fixed input DC bus 20 and is regulated by feedback from the welding operation 120 to provide current suitable for welding across output leads 102, 104. Leads 102 is a positive polarity lead and leads 104 is a negative polarity lead. In accordance with standard output technology for a two stage inverter based power sources, leads 102, 104 are directed to a standard polarity switch 110. This switch has a first position wherein lead 102 is directed to the electrode of the welding operation 120 so the output of polarity switch 110 has a positive polarity on output line 10a and a negative polarity on output line 10b. This produces an electrode positive DC welding process at weld operation 120. Reversal of polarity switch network 110 can produce an electrode negative DC welding process at weld operation 120. Thus, a DC welding process with either DC negative or DC positive can be performed according to the setting of the standard polarity switch 110. In a like manner, polarity switch 110 can be alternated between electrode negative and electrode positive to produce an AC welding process at weld operation 120. This is standard technology wherein polarity switch 110 drives the DC output from regulated converter 100 to produce either an AC welding process or a DC welding process. This process is regulated and controlled by a feedback system indicated as line or loop 122 directed to controller 130 for regulating converter 100 and for setting the polarity of switch 110 as indicated by lines 132, 134, respectively. By regulating the welding operation at stage III, the unregulated inverter at stage II can have a relatively higher switching frequency to reduce the component sizes within the second stage of the power source. The preferred embodiment of the present invention employs waveform control technology pioneered by The Lincoln Electric Company of Cleveland, Ohio. This type of control system is well known and is schematically illustrated in FIG. 9A wherein control circuit 150 processes a waveform profile as a voltage on line 152a is outputted from waveform generator 152. The waveform profile is controlled by feedback loop 122 as schematically illustrated by error amplifier 154 having an output 156. Thus, the profile of the waveform from generator 152 is controlled by the feedback loop 122 and produces a signal in output line 156. This line is directed to an appropriate pulse width modulator circuit 160 operated at a high frequency determined by the output of oscillator 162. This frequency is greater than 18 kHz and is often higher than 40 kHz. The regulated converter 100 preferably operates under 40 kHz. The output of the pulse width modulator, which is normally a digital circuit within controller 130, is shown as line 132 for controlling the waveform by way of regulated converter 100. In accordance with standard practice, the waveform of inverter 100 can have any profile, either AC or DC. This feature is schematically illustrated as waveform 152b, 152c and 152d at the right portion of FIG. 9A. Waveform 152b is an AC waveform of the type used in AC MIG welding where a higher negative electrode amperage is provided. A higher positive amperage is also common. In waveform 152c, the amperage for both electrode negative and electrode positive is essentially the same with the length of the negative electrode portion being greater. Of course, a process for AC welding can be adjusted to provide balanced AC waveforms or unbalanced AC waveforms, either in favor of electrode negative or electrode positive. When polarity switch 110 is set for either a DC negative or a DC positive welding operation, a pulse welding waveform, shown as waveform 152d, is controlled by waveform generator 152. Various other waveforms, both AC and DC, can be controlled by controller 130 so the welding operation 120 can be adjusted to be AC, or DC. Furthermore, the welding operation can be TIG, MIG, submerged arc or otherwise. Any process can be performed by power source PS4 or other power sources using the present invention. The electrode can be non-consumable or consumable, such as metal cored, flux cored or solid wire. A shielding gas may or may not be used according to the electrode being employed. All of these modifications in the welding operation can be performed by using the present invention. A modification of power source PS4 to perform only DC welding is illustrated as power source PS5 in FIG. 10. In this power source, welding operation 120 performs only a DC welding operation so that feedback loop 122 is directed to controller 170 having an output 172. Regulated converter 100a is preferably a chopper to produce a DC voltage across lines 102a, 104a. Controller 170 is controlled by waveform generator 152, as shown in FIG. 9A. The polarity on lines 102a, 104a is either electrode negative or electrode positive according to the demand of the DC welding process performed at welding operation 120. Regulated converter 100a is more simplified than the welding output of power supply PS4 shown in FIG. 9. FIGS. 9 and 10, together with the control network or circuit 150 shown in FIG. 9A, illustrates the versatility of the novel three stage power source constituting the present invention.

Figure 11:
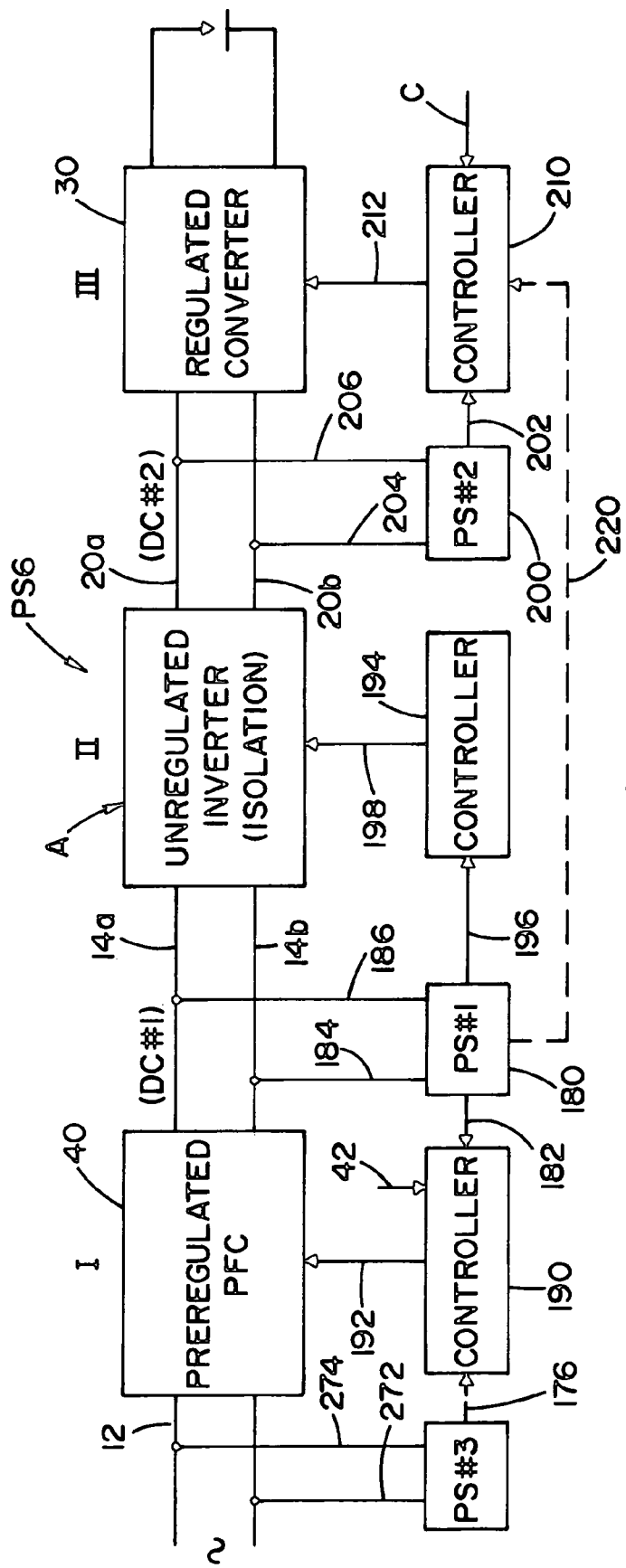
FIG. 11 is a block diagram illustrating the topography of a three stage power source constructed in accordance with the present invention for creating current suitable for electric arc welding with two separate controller control voltage supplies.

In implementing either a two stage power source as used in the prior art or the novel three stage power source of the present invention, it is necessary to provide a voltage for operating the controllers for both the regulated and unregulated switching networks used in these two types of power sources. FIG. 11 illustrates the architecture and scheme employed in the preferred embodiment of the present invention to obtain control voltages to operate the various controllers of a three stage power source, such as power source PS6. The use of an output of a preregulator to provide the control voltage for the switching controller of the preregulator and switching controller of the second stage of a two stage power source is well known and is disclosed in Moriguchi U.S. Pat. No. 5,926,381, incorporated by reference herein. An output chopper for performing a welding operation routinely obtains the controller control voltage from the input DC voltage to the chopper. These two well known technologies are incorporated in power source PS6. The three stage power source can be operated with controllers having power supplies derived from various locations in the power source. Being more specific, power source PS6 has a first power supply 180 with an output 182 and inputs 184, 186 from the first DC bus on leads 14a, 14b (DC#1). Power supply 180 includes a buck converter or flyback converter, not shown, to reduce the high voltage at the output of preregulator 40 of FIG. 2 to a low voltage on line 182. This control voltage on line 182 may be between 5 and 20 volts. Voltage on line 182 is directed to a first controller 190 having an output lead 192 for performing the operation of preregulator 40 in accordance with standard technology. The preregulator 40 has regulation feedback lines 42, 44 shown in FIGS. 2 and 3, but omitted in FIG. 11. Unregulated inverter A does not require a controller to modulate the duty cycle or the fixed relationship between the input and output voltages. However, the unregulated inverter A receives a control signal on an output lead 198 from a second controller 194 that receives controller operating voltage in line 196 from the first power supply 180. This arrangement is similar to the concept disclosed in Moriguchi U.S. Pat. No. 5,926,381, except second stage controller 194 is not a regulating controller as used in the two stage power source of the prior art. As an alternative, a third power supply PS#3 is driven by one phase of input 12 to give an optional power supply voltage to a first controller 190 shown as dashed line 176. Regulated output converter 30 of stage III has a second power supply 200 labeled PS#2 coupled to the second DC bus leads 20a and 20b via inputs 206 and 204, respectively, with a controller voltage on line 202 determined by the voltage on DC bus 20 (DC#2) illustrated as including leads 20a, 20b. Again, power supply 200 includes a buck converter or flyback converter to convert the DC bus at the output of unregulated converter A to a lower voltage for use by controller 210 having an output 212. The signal on line 212 regulates the output of welding converter 30 in accordance with the feedback signal on line C, as discussed with respect to power sources PS1, PS2 in FIGS. 1 and 2, respectively. DC bus 14 (DC#1) and DC bus 20 (DC#2) provides input to power supplies 180, 200 which are DC to DC converters to produce low level DC control voltage for controllers 190, 194 and 210.

As an alternative shown by dashed line 220, the first power supply 180 labeled PS#2 can provide a control voltage for the third controller 210. FIG. 11 has been disclosed to illustrate the versatility of using a three stage power source with controllers that can receive reduced supply voltages from various fixed DC voltage levels indicated to be PS#1 and PS#2. Other arrangements could be employed for providing the controller voltage, such as a rectified connection to one phase of AC input voltage 12 via lines 272 and 274 by a transformer in a manner illustrated as PS#3.

Figure 12:
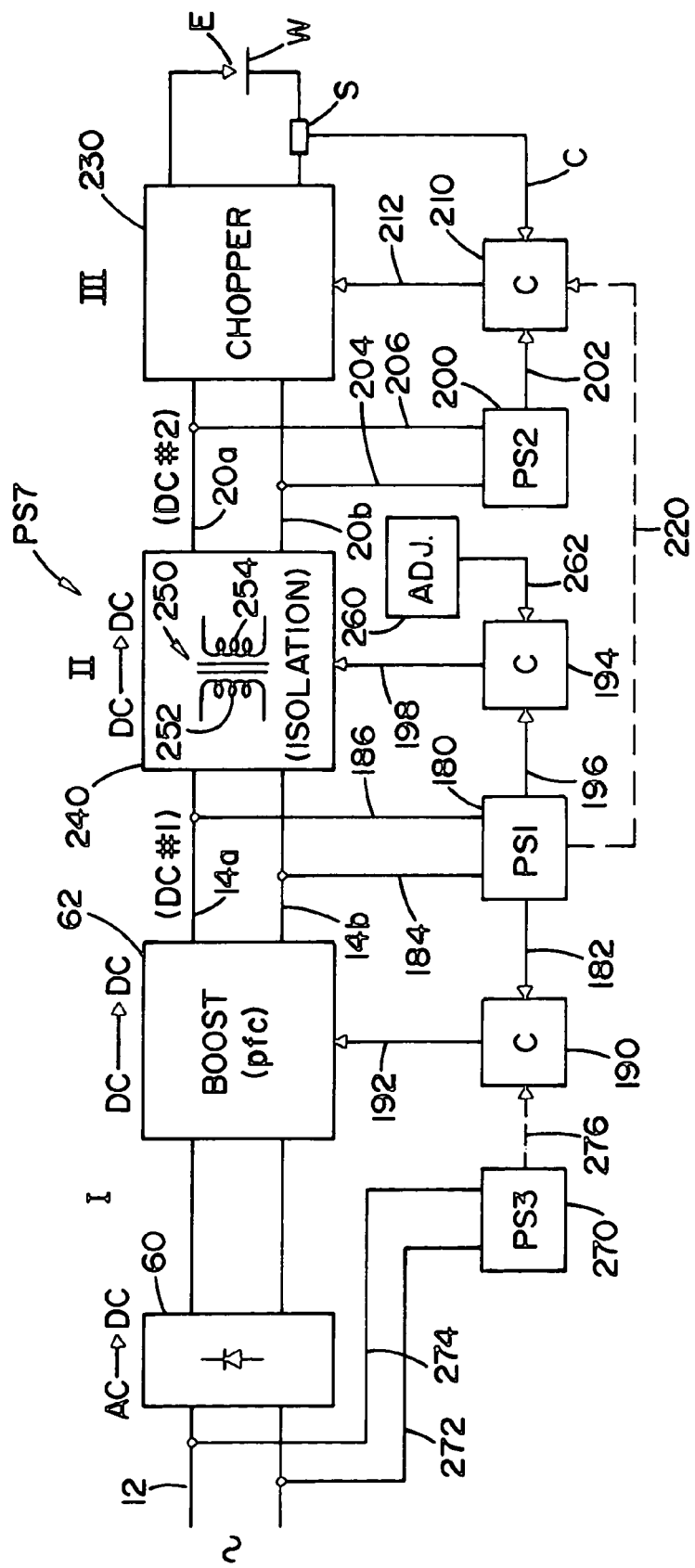
FIG. 12 is a block diagram illustrating a specific power source employing the topography of the present invention.

Another implementation of the present invention with more specific details on the preferred embodiment of the present invention is illustrated in FIG. 12 wherein power source PS7 is similar to power source PS6 with components having the same identification numbers. In the preferred embodiment of the present invention, the output stage III is a chopper 230 for directing a DC current between electrode E and workpiece W. Current shunt S provides the feedback signal C to controller 210. High switching speed inverter 240 of stage II has characteristics so far described with the isolation provided by transformer 250 having primary winding 252 and secondary winding 254. The primary side of DC to DC converter 240 is the switching network directing an alternating current to primary winding 252. The rectified output from secondary 254 is the secondary section or side of converter 240. Converter 240 employs a high switching speed inverter that has a duty cycle or phase shift set by controller 194. The switching frequency is about 100 kHz in the practical version of this power source. The duty cycle remains the same during the welding operation by chopper 230; however, in accordance with the invention, the duty cycle or phase shift of the inverter may be adjusted as indicated by "ADJ" circuit 260 having an output 262 for adjusting controller 194. In the preferred embodiment, the duty cycle is close to 100% so that the switch pairs are conductive together their maximum times at the primary side of inverter 240. However, to change the fixed relationship between the first DC bus 14 and the second DC bus 20, circuit 260 can be used to adjust the duty cycle or phase shift. Thus, the unregulated, isolation inverter 240 is changed to have a different, but fixed duty cycle. However, the duty cycle normally is quite close to 100% so the switch pairs are operated essentially in unison. The duty cycle probably varies between 80-100% in normal applications of the present invention. In the preferred implementation, boost converter 62 shown in FIG. 4 is used for a power factor correcting input stage I. This boost converter is operated in accordance with controller 190 having a control voltage 182 as previously described. In accordance with a slight modification of the preferred embodiment, supply 270 has a transformer connected by lines 272 and 274 across one phase of a single phase or three phase AC input 12. A rectifier and filter in power supply 270 produces a low control voltage in optional dashed line 276 for use instead of the control voltage in line 182 if desired. These two alternatives do not affect the operating characteristics of power source PS7. Other such modifications of a three stage power source for electric arc welding can be obtained from the previous description and well known technology in the welding field.

Figure 13:
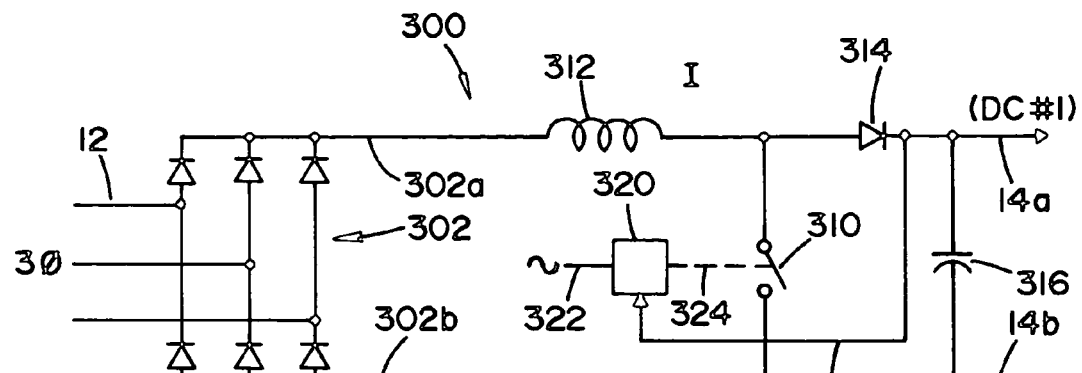
FIGS. 13-16 are wiring diagrams illustrating four different circuits for correcting the power factor in the first stage of a power source constructed in accordance with the present invention.
Figure 14:
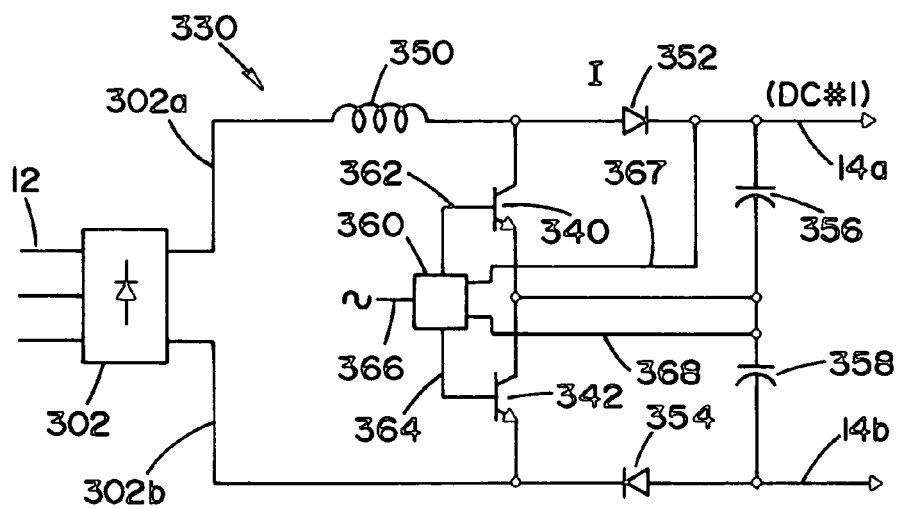
Figure 15:
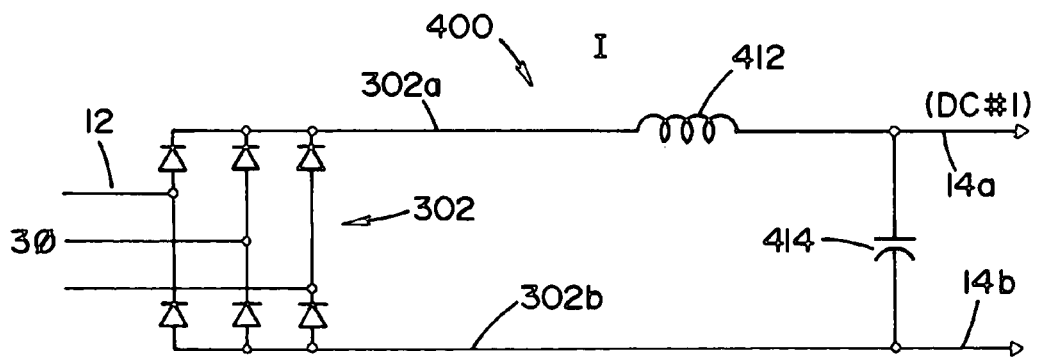
Figure 16:
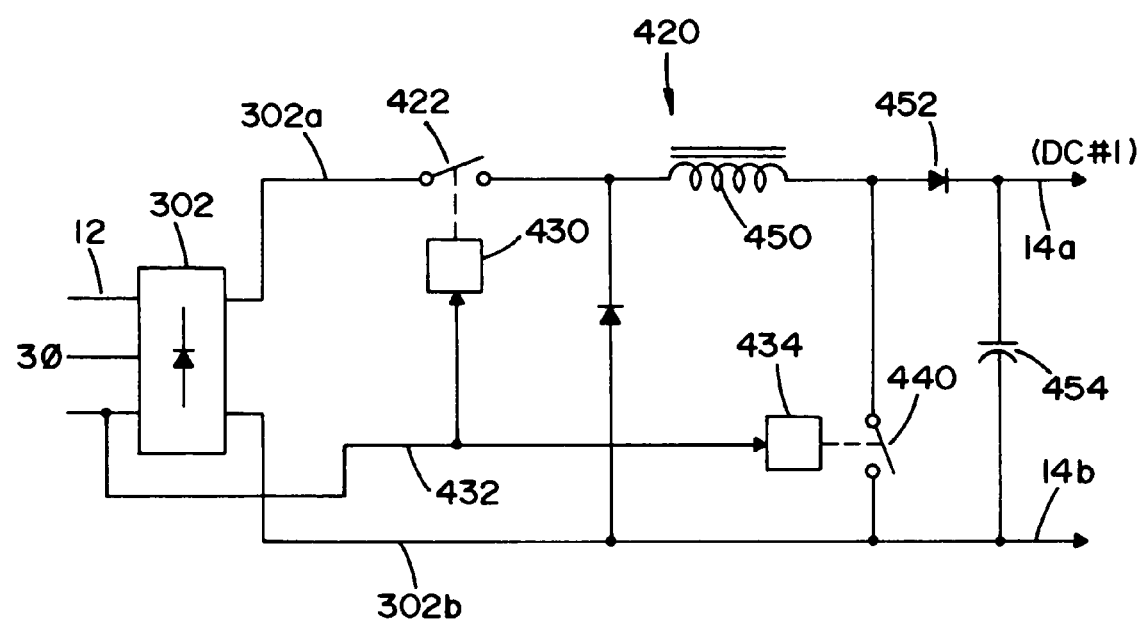

Input stage I normally includes a rectifier and a power factor correcting DC to DC converter as disclosed in FIGS. 4-8. These input stages can be used for both three phase and single phase AC signals of various magnitudes, represented as input 12. Certain aspects of an input stage for three phase AC input power are disclosed with respect to the circuits in FIGS. 13-16. Each of these circuits has a three phase input and a DC bus output (DC#1) that is obtained with a low harmonic distortion factor and a high power factor for the input stage. The disclosure in FIGS. 1-12 are generally applicable to the novel three stage power source; however, the particular stage I used is relevant to both a two stage power source of the prior art or a three stage power source of the present invention. In FIG. 13, the input circuit 300 of stage I includes a three phase rectifier 302 with output leads 302a, 302b. Boost switch 310 is in series with an inductor 312, diode 314 and a parallel capacitor 316. An appropriate circuit 320 which is a standard power factor correcting chip has an input 322 to determine the input voltage, a regulation feedback line 322a and an output 324 for operating the boost switch to cause the current in input 12 to be generally in phase with the input voltage. This chip is a standard three phase power factor correcting boost converter chip that can be used in the present invention and is also used for a normal two stage power source. In a like manner, input circuit 330 shown in FIG. 14 has a three phase rectifier 302 with output leads 302a, 302b as previously described. A boost circuit including inductor 350, diodes 352, 354 and capacitors 356, 358 are used in conjunction with switches 340, 342 to provide coordination of the current at the output of circuit 330 and input voltage 12. To accomplish this objective, a standard chip 360 provides gating pulses in lines 362, 364 in accordance with the sensed voltage in input 366 and feedback regulation signals in lines 367, 368. This is standard technology to provide three phase power factor correction of the type that forms the input of a two stage power source or the novel three stage power source of the present invention. It has been found that the active three phase circuits 300, 330 when operated on a three phase input provide an input power factor of about 0.95. The power factor of a stage I when having a single phase AC input can be corrected upwardly to about 0.99. Since a three phase power source can generally be corrected only to a lower level, it has been found that a passive circuit for the input stage I of a two stage or three stage power source is somewhat commensurate with the ability of an active power factor correcting circuit. A standard passive circuit 400 is shown in FIG. 15, wherein each of the three phases is rectified by three phase rectifier 302 which directs DC current through output leads 302a, 302b to a filter circuit including inductor 412 and capacitor 414. It has been found that a passive circuit such as shown in FIG. 15 can correct the power factor of the three phase input to a level generally in the range of about 0.95. This is somewhat the same as the ability of an active circuit for a three phase input circuit. A buck+boost input circuit 420 is shown in FIG. 16. Rectified current on lines 302a, 302b is first bucked by switch 422 using standard power factor correcting chip 430 having a line 432 having a voltage waveform signal from input 12, that also steers chip 434 to operate boost switch 440. Switches 422, 440 are operated in unison to control the input power factor using a circuit containing inductor 450, diode 452 and capacitor 454. Circuits 300, 330, 400 and 420 are standard three phase passive power factor correcting circuits using standard technology and available switches controlled by the input voltage waveform and the current of DC#1. FIGS. 13-16 are illustrative of certain modifications that can be made to the first stage of the three stage power source of the present invention. Of course, there is other technology for improving the power factor and reducing the harmonic distortion of both DC and AC signals of the type used to drive power sources of electric arc welders. Any standard circuit can be incorporated in the present invention in the same manner as they are used in other power sources that do not employ the novel concepts of the present invention.

Figure 17:
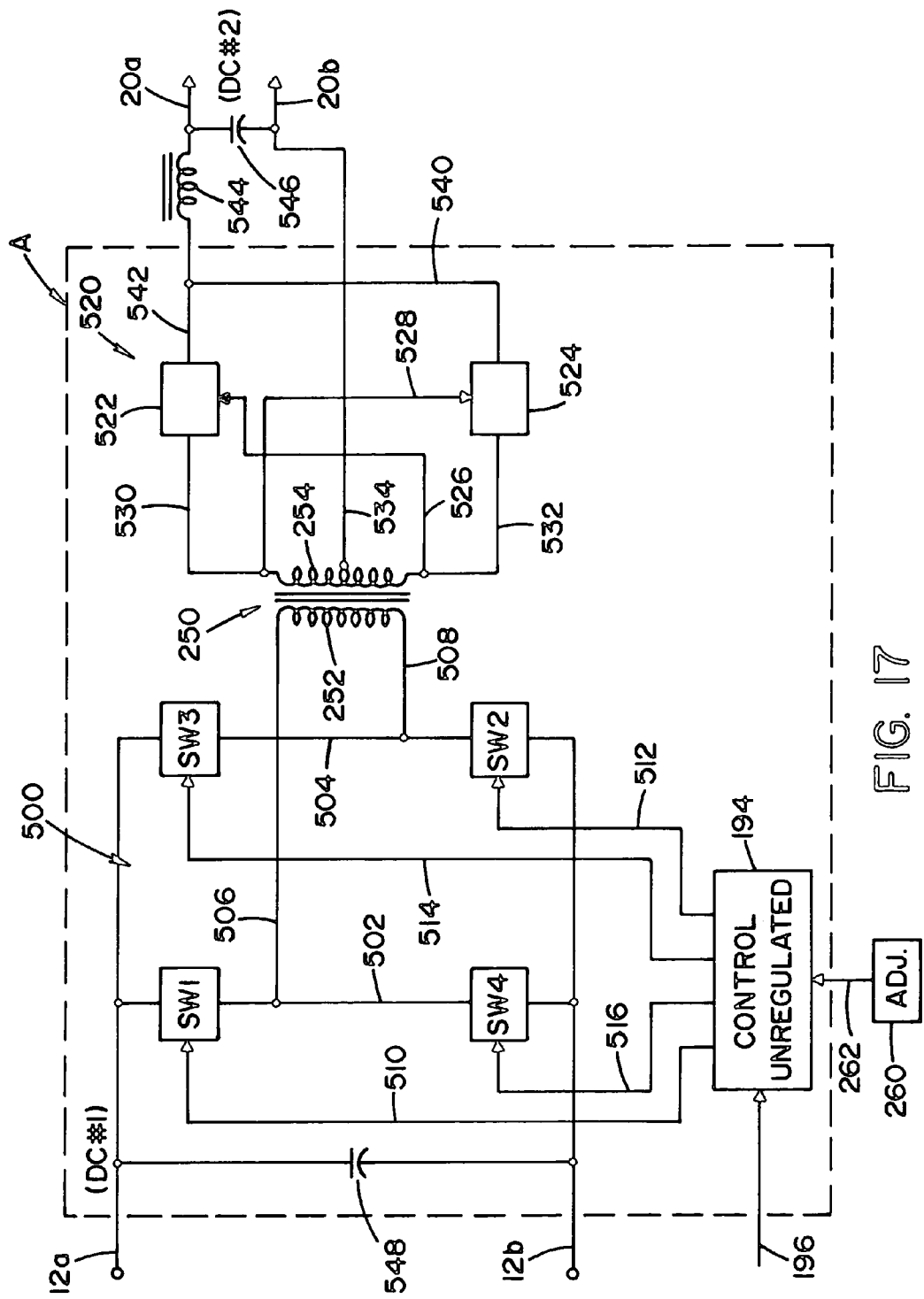
FIG. 17 is a combined block diagram and wiring diagram illustrating the preferred embodiment of the unregulated inverter constituting the novel second stage of a power source constructed in accordance with the present invention; and, FIGS. 18-21 are wiring diagrams showing several inverters used as the second stage unregulated, isolation inverter comprising the novel aspect of the present invention.

Unregulated inverter A of stage II can use various inverter circuits. The preferred circuit is illustrated in FIG. 17 wherein the inverter is divided between a primary section or side defined by the input to primary winding 252 of isolating transformer 250 and a secondary section or side defined by output of secondary winding 254. Referring first to the primary section or side of inverter A, full bridge circuit 500 is employed wherein paired switches SW1-SW3 and SW2-SW4 are across capacitor 548 are connected by leads 502, 504, 506, and 508. The switches are energized in alternate sequence by gating pulses on lines 510, 512, 514, and 516, respectively. Controller 194 outputs gating pulses in lines 510-516 and an adjusted duty cycle determined by the logic on line 262 from circuit 260 as previously discussed. The duty cycle is controlled by changing the phase shift of lines 510 and 512 ad lines 514 and 516. Circuit 260 adjusts the duty cycle or phase shift of the paired switches. This adjustment is fixed during the operation of inverter A. In practice, circuit 500 has about 100% duty cycle or phase shift, where each pair of switches has maximum periods of overlapping conduction. Controller 194 has a control voltage from an appropriate supply indicated by line 196, as also previously described. In operation of circuit 500, an alternating current is directed through primary winding 252. This current has an ultra high frequency normally at least about 100 kHz so the components can be reduced in size, weight and cost. The high switching frequency is not dictated by the welding operation, but is selected for efficiency of unregulated stage A of the three stage power source. The secondary section or side of inverter A is a rectifier 520 having synchronous rectifier devices 522, 524 with outputs 542 and 540, respectively. Synchronous rectifier devices are well known in the general electrical engineering art and are discussed in Boylan U.S. Pat. No. 6,618, 274 incorporated by reference herein. These devices are gated by signals on lines 526, 528 created at the opposite ends of secondary winding 254 in accordance with standard technology. Leads 530, 532, 534, 540, and 542 form the output leads of rectifier 520 to create a DC voltage (DC#2) across leads 20a, 20b. The current is smooth by a choke 544 and is across capacitor 546, in accordance with standard welding technology. Inverter A is unregulated which means that it is not adjusted by a real time feedback signal from the welding operation. It merely converts DC bus 12 (DC#1) to DC bus 20 (DC#2). This conversion allows a substantial reduction in the voltage directed to the regulated third stage of the power source using inverter A. The reduction in voltage is primarily determined by the turns ratio of transformer 250, which ratio, in the preferred embodiment, is about 4:1. Thus, the fixed voltage on output bus 20 is about ¼ the fixed voltage on output bus 12 of the first stage. Several advantages of an unregulated stage are contained in an article entitled *The incredible Shrinking (Unregulated) Power Supply* by Dr. Ray Ridley incorporated by reference herein as background information. A basic advantage is the ability to increase the frequency to above 100 kHz to reduce the size and cost of the inverter stage.

Figure 18:
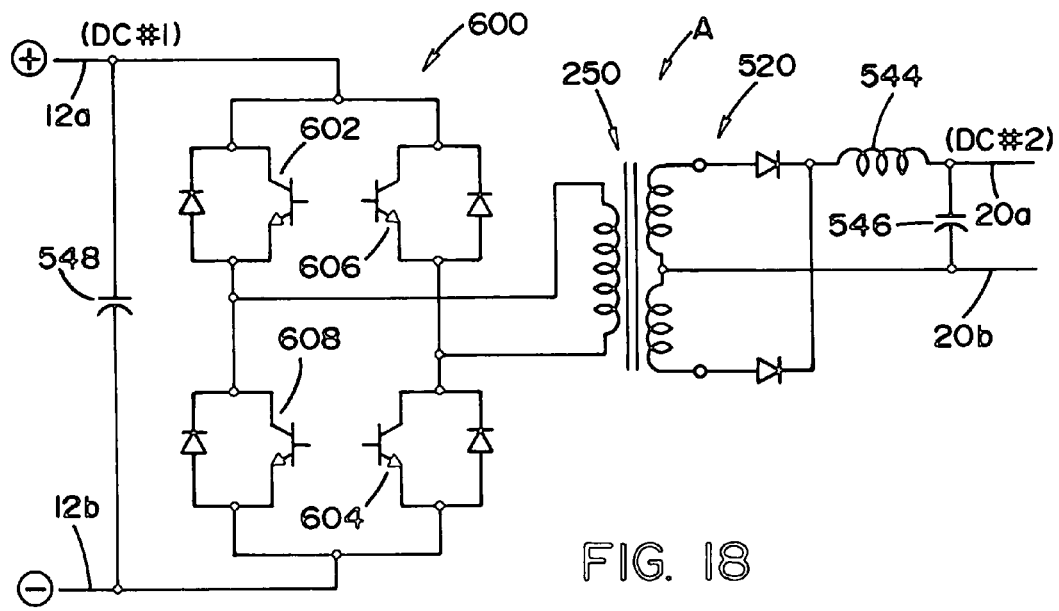
Figure 19:
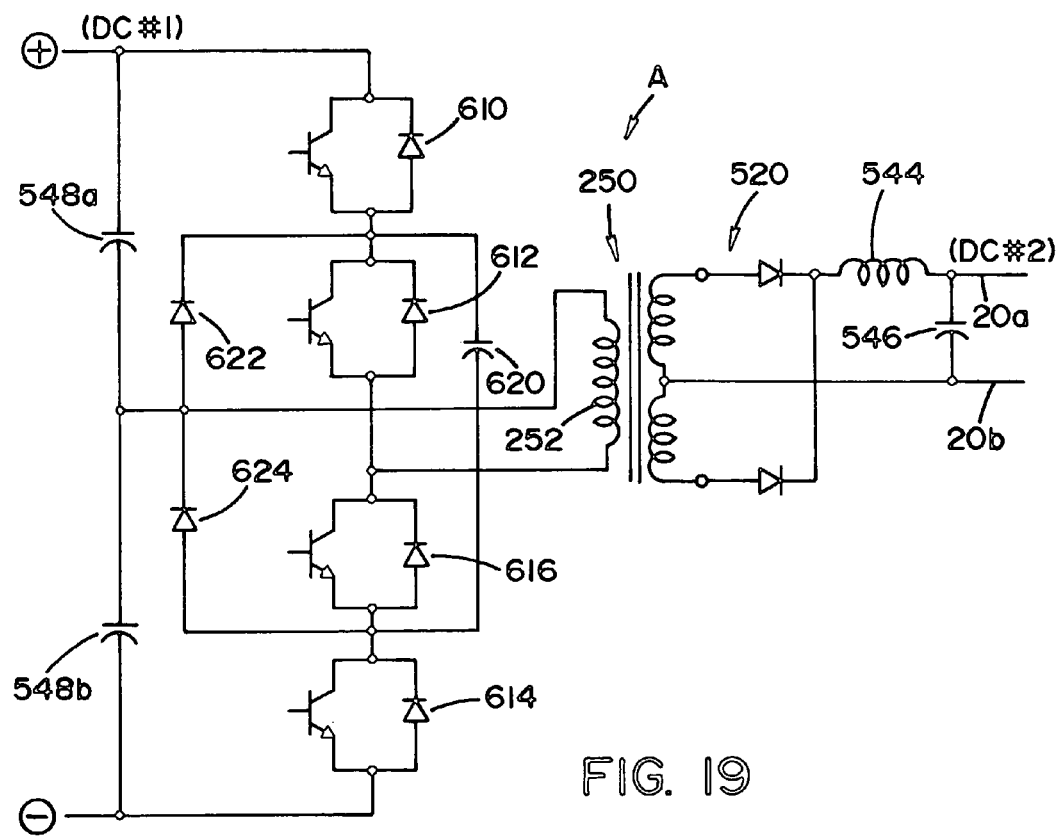
Figure 20:
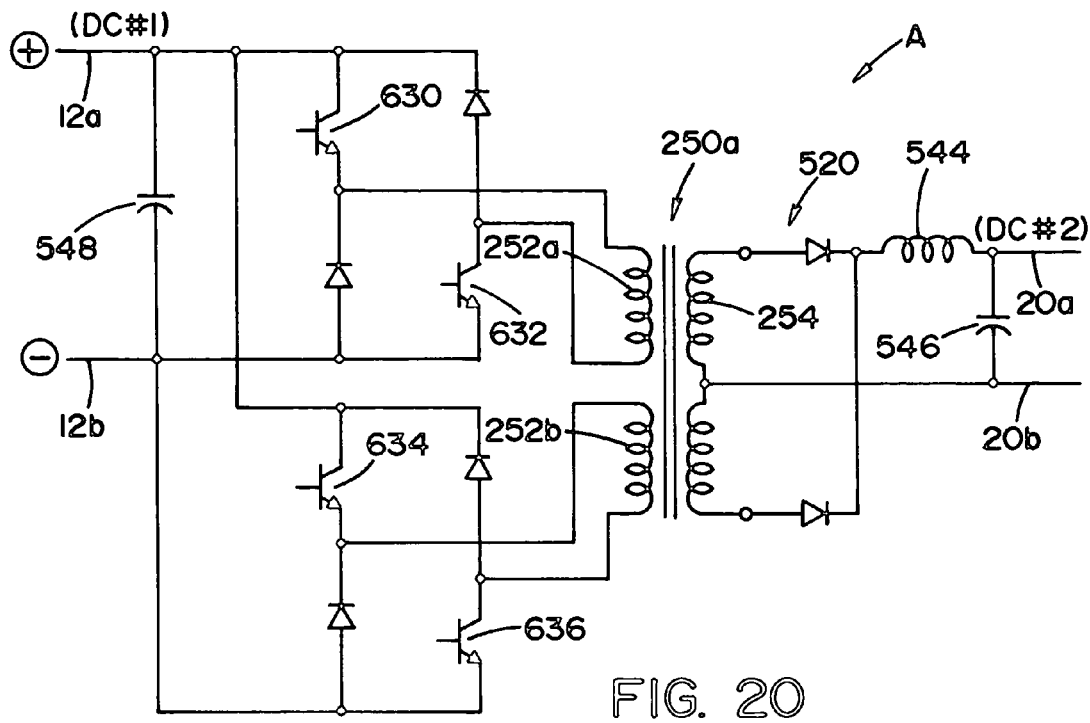
Figure 21:
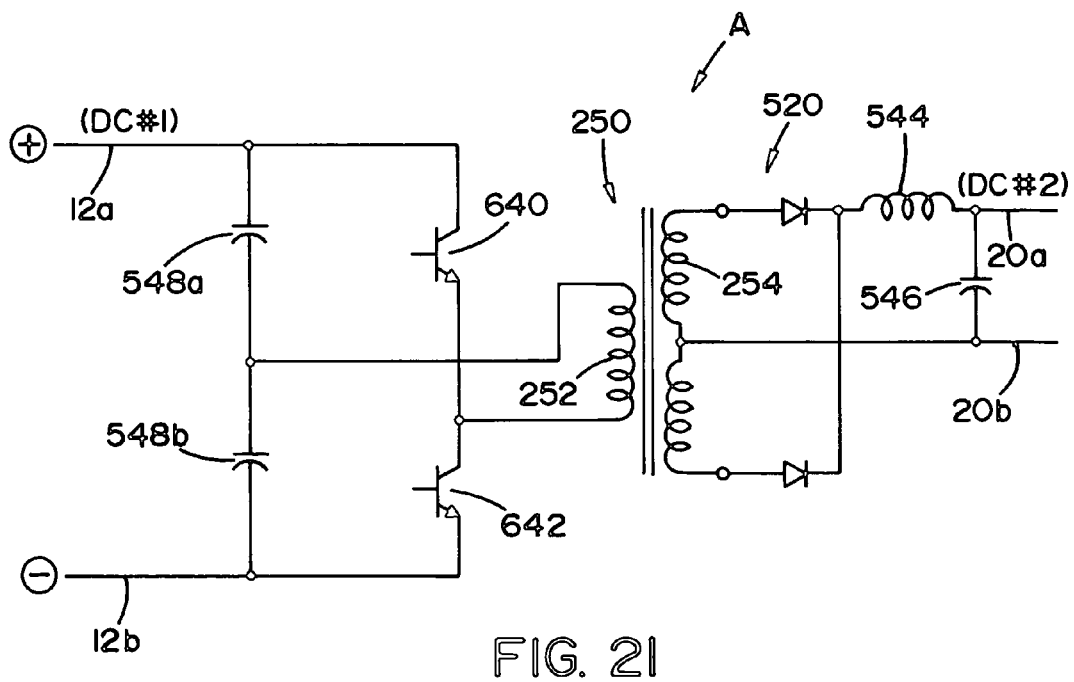

Various circuits can be used for the unregulated inverter A constituting novel stage II of the invention. The particular type of inverter is not a limiting feature of the invention. Several inverters have been used in the invention. Some are illustrated in FIGS. 18-21. In FIG. 18, inverter A is shown as using a full bridge circuit 600 on the primary side of transformer 250. A switch and diode parallel circuit 602, 604, 606 and 608 are operated in accordance with the standard phase shift full bridge technology, as explained with respect to the inverter A version shown in FIG. 17. A modification of the internal workings for inverter A is illustrated in FIG. 19 utilizing a cascaded bridge with series mounted switch circuits 610, 612 and 614, 616. These switch circuits are operated similar to a half bridge and include input capacitors 548a, 548b providing energy for the switching circuits which in parallel is capacitor 620 and is in series with diode 622, 624. The two switch circuits are in series so there is a reduced voltage across individual switches when a phase shift control technique similar to the technique for the full bridge inverter of FIG. 17 is used. This type of inverter switching network is illustrated in Canales-Abarca U.S. Pat. No. 6,349,044 incorporated by reference herein showing an inverter using a cascaded bridge, sometimes referred to as a three level inverter. A double forward inverter is shown in FIG. 20 wherein switches 630, 632 provide a pulse in section 252a of the primary winding for transformer 250a. In a like manner, switches 634, 636 are operated in unison to provide an opposite polarity pulse in primary section 252b. The alternating pulse produces an AC at the primary winding of transformer 250a to produce an isolated DC output in secondary winding 254. A standard half bridge circuit is shown as the architecture of inverter A in FIG. 21. This half bridge includes switches 640, 642 alternately switched to produce an AC in primary winding 252 of transformer 250. These and other switching circuits can be used to provide an AC signal in the primary winding of transformer 250 so that the secondary isolated AC signal is rectified and outputted on leads 20a, 20b as DC#2. The mere description of certain representative standard switching networks is not considered to be exhaustive, but just illustrative.

The invention involves a power source for electric arc welding wherein the control of the welding current is not performed in the second stage. In this stage, a DC bus having a high voltage is converted to a fixed DC bus (DC#2) having a low voltage for the purposes of driving a third stage, which third stage is a regulated stage to provide a current suitable for electric arc welding. Electric arc welding incorporates and is intended to include other welding related applications such as the concept of plasma cutting. The various circuits used in the three stages can be combined to construct various architectures for the basic topography which is a three stage power source.

Having thus defined the invention, the following is claimed:

1. A power source for an electric arc welding process having a topology with each stage of the topology defined by an input and an output signal, said power source comprising:

an input stage being a converter having an AC input signal and a first fixed DC output signal, having a first magnitude, said first fixed DC output signal being on a first DC bus;

a second stage in the form of an unregulated DC to DC converter having as an input signal said first fixed DC signal on said first bus, the second stage being unregulated such that the second stage is not adjusted by a real time feedback signal from the welding process and including:

a network of switches switched at a high frequency with a given duty cycle to convert said first fixed DC input signal of said second stage into a first internal high frequency AC signal, said duty cycle being fixed during operation of said power source;

an isolation transformer with a primary winding and a secondary winding for creating a second internal AC signal different than the first AC signal; and a rectifier to convert said second internal AC signal into a second fixed DC output signal not used for welding having a second magnitude related to said duty cycle of said switches, said second magnitude being less than said first magnitude, said second fixed DC output signal being on a second DC bus; and a third stage regulated converter which receives said second fixed DC signal as an input signal and is regulated by a feedback signal from the welding process, said third stage to convert said second fixed DC signal to an output signal used for welding, said third stage converting said second fixed DC signal separate and distinct of said input and second stages.

2. A power source as defined in claim 1 wherein said input stage includes a rectifier and a power factor correcting converter.

3. A power source as defined in claim 2 wherein said power factor correcting converter is a buck+boost converter.

4. A power source as defined in claim 2 wherein said power factor correcting converter is a two level converter.

5. A power source as defined in claim 2 wherein said power factor correcting converter is an active converter.

6. A power source as defined in claim 1 wherein said AC input is a three phase or a single phase input.

7. A power source as defined in claim 1 wherein said input stage comprises a regulated converter stage having a controller with a control voltage and a voltage circuit to provide said control voltage from said first DC output signal.

8. A power source as defined in claim 7 wherein said input regulated converter stage includes a feedback circuit from said first fixed DC signal to regulate said input converter stage.

9. A power source as defined in claim 7 wherein said input regulated converter stage includes a feedback circuit from said second fixed DC signal to regulate said input converter stage.

10. A power source as defined in claim 1 wherein said network of switches is a full bridge inverter.

11. A power source as defined in claim 1 wherein said duty cycle is fixed at about 100%.

12. A power source as defined in claim 1 wherein said duty cycle is adjustable when the power source is not operating.

13. A power source as defined in claim 1 wherein said high switching frequency is greater than about 18 kHz.

14. A power source as defined in claim 1 wherein said primary winding has substantially more turns than said secondary winding.

15. A power source as defined in claim 1 wherein said third stage is a chopper.

16. A power source as defined in claim 1 wherein said power source has an output power capacity of at least 5 KW.

17. A power source as defined in claim 1 including a circuit to regulate said third stage by said current suitable for welding.

18. The power source of claim 1, wherein said first fixed DC output signal is regulated and controlled to a voltage between 400 and 500 volts.

19. The power source of claim 18, wherein said second fixed DC output signal is about ¼ the voltage of said first fixed DC bus.

20. A method of providing a regulated welding output from a first AC power supply input signal to a power source topology with each stage of the topology defined by an input and an output signal, said method comprising:
(a) converting said first AC supply input signal to a first stage of the topology into a first fixed DC bus voltage output signal on a first DC bus;
(b) converting said first fixed DC bus voltage as an input signal to a second stage of the topology into a second AC signal using a network of switches of said second stage, said network of switches having a fixed duty cycle defined by a controller output that is unregulated so as not to be adjusted by a real time feedback signal from the welding output;
(c) rectifying said second AC signal to a second fixed DC bus voltage output signal not used for welding on a second DC bus where said second fixed DC bus voltage is the product of the first DC bus multiplied by a constant such that the second fixed DC bus voltage is less than the first fixed DC bus voltage and said second DC bus is isolated by said second stage from said first DC bus;
(d) converting said second fixed DC bus voltage as an input signal to a third stage of the topology into an output signal of the third stage used for welding, wherein said second fixed DC bus voltage is converted separate and distinct of said first and said second stages; and
(e) regulating said output signal of said third stage with a feedback signal from said welding output such that said output signal of said third stage is a desired regulated welding output.

21. A method as defined in claim 20 wherein said first stage further includes:
(f) power factor correcting of said first stage.

22. A method as defined in claim 20 wherein said second stage is a high switch frequency inverter and includes an isolation transformer.

23. A method as defined in claim 20 wherein said second stage includes an isolation transformer with a turn ratio and said constant is at least partially determined by said turn ratio.

24. A method as defined in claim 20 wherein said second stage includes a switching network wherein said switches of said network have a fixed duty cycle.

25. A method as defined in claim 24 wherein said fixed duty cycle is adjustable.

26. A method as defined in claim 20 wherein said third stage is a chopper.

27. A method as defined in claim 20 wherein said regulated welding current has a power of over 2 KW.

28. A method as defined in claim 20 wherein said first stage has a controller with a controller voltage and said method includes:
(f) deriving said controller voltage from said first DC bus.

29. A method as defined in claim 28 wherein said third stage has a controller with a controller voltage and said method includes:
(g) deriving said controller voltage of said third stage controller voltage from said second DC bus.

30. A method as defined in claim 20 wherein said third stage has a controller with a controller voltage and said method includes:
(f) deriving said third stage controller voltage from said second DC bus.

31. The method of claim 20, wherein converting said AC power supply signal to said first fixed DC bus voltage includes regulating and controlling said first fixed DC bus voltage to a voltage between 400 and 500 volts.

32. The method of claim 31, wherein converting the first fixed DC bus voltage provides that the second fixed DC bus voltage is about ¼ the voltage of the first fixed DC bus voltage.

33. A power source for an electric arc welding process having a topology with each stage of the topology defined by an input and an output signal, said power source comprising:
an input stage having a rectifier and a DC to DC converter for converting an AC input signal to a first fixed DC output signal;
a second stage in the form of an unregulated DC to DC converter such that it is not adjusted by a real time feedback signal from the welding process, the second stage having an input in the form of a first DC bus for said first fixed DC signal and an output in the form of a second DC bus for a second fixed DC output signal that is not suitable for welding, electrically isolated from said first DC signal and with a magnitude of a given ratio to said first fixed DC signal; and a third stage regulated converter having said second fixed DC signal as an input signal to the third stage, said third stage being regulated by a feedback signal from the welding process to convert said second fixed DC signal to a current output signal suitable for welding, said third stage converting said second fixed DC signal separate and distinct of said input and second stages.

34. A power source as defined in claim 33 wherein said input stage DC to DC converter includes a power factor correcting converter.

35. A power source as defined in claim 34 wherein said power factor correcting converter is a buck+boost converter.

36. A power source as defined in claim 34 wherein said power factor correcting converter is an active converter.

37. A power source as defined in claim 33 wherein said AC input is a three phase or single phase input.

38. A power source as defined in claim 33 wherein said input stage comprises a regulated converter stage having a controller with a control voltage and a voltage circuit to provide said control voltage from said first fixed DC signal.

39. A power source as defined in claim 33 wherein said second stage is an inverter.

40. A power source as defined in claim 39 wherein said inverter has switches with a high switching frequency wherein said switches have a fixed duty cycle for operating said switches.

41. A power source as defined in claim 40 wherein said duty cycle is fixed at about 100%.

42. A power source as defined in claim 40 wherein said duty cycle is adjustable.

43. A power source as defined in claim 40 wherein said duty cycle is controlled by phase shift of said switches.

44. A power source as defined in claim 40 wherein said high switching frequency is greater than about 18 kHz.

45. A power source as defined in claim 33 wherein said second stage has an isolation transformer with a primary winding and a second winding.

46. A power source as defined in claim 45 wherein said primary winding has substantially more turns than said secondary winding such that said second fixed DC output signal is less than said first DC output signal.

47. A power source as defined in claim 33 wherein said third stage is a chopper.

48. A power source as defined in claim 33 wherein said power source has an output power capacity of at least 5 KW.

49. The power source of claim 33, wherein the first fixed DC output signal is regulated and controlled to a voltage between 400 and 500 volts.

50. The power source of claim 49, wherein the second fixed DC output signal is about ¼ the voltage of the first fixed DC output signal.

51. A power source for an electric arc welding process having a topology with each stage of the topology defined by an input and an output signal, said power source comprising:

a first power factor correcting input stage for converting an AC input signal to a first regulated fixed DC bus voltage output signal on a first fixed DC bus;

a second stage switching inverter having a primary side and a secondary side including a network of switches operated at a fixed duty cycle for converting said first fixed DC bus voltage as an input signal to the second stage to a second fixed DC bus voltage output signal not used for welding on a second fixed DC bus isolated from said first fixed DC bus, said second stage being unregulated so as not to be adjusted by a real time feedback signal from the welding process and including:

an isolating transformer having a primary winding defining the primary side of said second stage and a secondary winding defining the secondary side of said second stage;

said second stage further including a plurality of capacitors including a primary side capacitor and a secondary side capacitor, said network of switches operating across said primary side capacitor; and a regulated third stage converter having said second fixed DC bus voltage as an input signal, said third stage converter converting said second fixed DC bus voltage into an output signal used for welding, said third stage converter being regulated by feedback of a parameter from said electric arc welding process such that the third stage converts said second fixed DC bus voltage separate and distinct from said first and second stage.

52. A power source as defined in claim 51 wherein said input stage includes a rectifier and a power factor correcting converter said third stage includes a control circuit and a waveform generator for regulating the third stage converter to provide the regulated welding signal with a feedback parameter from said welding process.

53. A power source as defined in claim 52 wherein said power factor correcting converter is a buck+boost converter.

54. A power source as defined in claim 52 wherein said power factor correcting converter is an active converter.

55. A power source as defined in claim 51 wherein said third stage is a chopper.

56. A power source as defined in claim 51 wherein said power source has an output power capacity of at least 5 KW.

57. The power source of claim 51, wherein the first fixed DC bus voltage is regulated and controlled to a voltage between 400 and 500 volts.

58. The power source of claim 57, wherein the second fixed DC bus voltage is about ¼ the voltage of the first fixed DC bus voltage.

59. A power source for an electric arc welding process having a three stage topology with each stage defined by an input and an output signal, said power source comprising:

a first stage having an AC input signal, a first fixed DC output signal, and a first stage controller with a voltage input and a first control output for providing a first control signal to said first stage;

a second stage having an input connected to said first fixed DC signal for an input signal to the second stage, an output signal in the form of a second fixed DC output signal that is not used for welding and is electrically isolated from said first fixed DC signal, a switching network wherein said switches of said network have a fixed operating duty cycle at a switching frequency of at least 100 kHZ as defined by a second stage controller with a voltage input and a second control output for providing a second control signal to said second stage, said second stage being unregulated such that said second stage is not adjusted by a real time feedback signal from said welding process; and a third stage having an input connected to said second fixed DC signal for an input signal to the third stage and a third stage controller with a voltage input and a third control output for providing a regulated third control signal to said third stage for converting said second fixed DC signal to an output signal used for welding, the converting of the second fixed DC signal being separate and distinct of said first and said stages.

60. The power source as defined in claim 59, wherein said second stage is an unregulated DC to DC isolation converter.

61. The power source as defined in claim 59, further comprising a first power supply providing a first controller voltage to a voltage input of one of said controllers.

62. The power source as defined in claim 61, wherein said first power supply provides said first controller voltage to said voltage input of said second controller.

63. The power source as defined in claim 61, further comprising a second power supply providing a second controller voltage to said voltage input of said second controller.

64. The power source as defined in claim 61, wherein said first power supply provides said first controller voltage from said first fixed DC output signal.

65. The power source as defined in claim 61, wherein said first power supply provides said first controller voltage from said second fixed DC output signal.

66. The power source as defined in claim 63, wherein said second power supply provides said second controller voltage from said second fixed DC output signal.

67. The power source of claim 59, wherein said first fixed DC bus voltage is regulated and controlled at a level between 400 and 500 volts.

68. The power source of claim 67, wherein the second fixed DC bus voltage is about ¼ the voltage of the first fixed DC bus voltage.

69. A method of MIG welding including:
 (a) advancing a welding wire toward a workpiece;
 (b) generating a welding output signal with a three stage power source having each stage defined by an input signal and an output signal, the three stage power source including a regulated input stage with an AC input signal, a first fixed DC output signal and a center stage in the form of an unregulated DC-DC converter such that said center stage is not adjusted by a real time feedback of the welding output signal, the center stage having said first fixed DC signal as an input signal with a second fixed DC output signal isolated from and less than said first fixed DC output signal, said second fixed DC output signal not used for welding; and
 (c) creating said welding output signal from said second fixed DC signal by regulating an output stage driven by said second fixed DC signal as an input signal to said output stage, said output stage being regulated by said welding output signal to convert said second fixed DC signal to said welding output signal which is used for welding, said output stage converting said second fixed DC signal separate and distinct of said input and center stages.

70. A method as defined in claim 69 wherein said center stage is an unregulated isolation full bridge inverter.

71. A method as defined in claim 69 wherein said welding output signal is a DC signal.

72. A method as defined in claim 69 including:
 (d) providing a granular flux around said welding wire and on said workpiece.

73. A method as defined in claim 69 wherein said welding wire is a flux cored electrode.

74. The method of claim 69, wherein the first fixed DC output signal of the regulated input stage is controlled to a level between 400 and 500 volts.

75. The method of claim 74, wherein the second fixed DC output signal of the unregulated DC-DC converter is ¼ the voltage of the first fixed DC bus.

76. A power source for an electric arc welding process having a topology with each stage of the topology defined by an input and an output signal, said power source comprising:
 an input stage having a rectifier and a preregulated power factor correcting converter for converting an AC input signal into a first fixed DC output signal having a first magnitude;
 a second stage in the form of an unregulated DC to DC converter such that said second stage is not adjusted by a real time feedback signal from the welding process, said second stage having an input connected to said first fixed DC signal, the second stage including:
  a controller;
  a network of switches switched at a frequency of at least 100 kHz with a given duty cycle by said controller so as to convert said first fixed DC output signal at said second stage input into a first internal AC signal, said duty cycle being fixed during operation of said power source;
  an isolation transformer with a primary winding and a secondary winding for creating a second internal AC signal different than the first AC signal; and
  a rectifier to convert said second internal AC signal into a second fixed DC output signal having a second magnitude related to a turn ratio defined by the primary and secondary windings such that the second magnitude is less than the first magnitude and not used for welding; and
 a third stage having said second fixed DC signal as an input signal to the third stage to convert said second fixed DC signal to an output signal used for welding, said third stage being regulated by a feedback signal from said process such that said third stage converts said second fixed DC signal separate and distinct of said input and said second stages.

* * * * *